United States Patent
Abotabl et al.

(10) Patent No.: US 12,495,359 B2
(45) Date of Patent: Dec. 9, 2025

(54) OPERATING STATES IN GREEN NETWORK ENERGY SAVING MODES

(71) Applicant: QUALCOMM Incorporated, San Diego, CA (US)

(72) Inventors: Ahmed Attia Abotabl, San Diego, CA (US); Hung Dinh Ly, San Diego, CA (US); Ahmed Elshafie, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 602 days.

(21) Appl. No.: 17/834,648

(22) Filed: Jun. 7, 2022

(65) Prior Publication Data

US 2023/0397101 A1 Dec. 7, 2023

(51) Int. Cl.
*H04W 52/02* (2009.01)
*H04W 72/0446* (2023.01)
*H04W 72/1263* (2023.01)

(52) U.S. Cl.
CPC ... *H04W 52/0209* (2013.01); *H04W 52/0206* (2013.01); *H04W 72/0446* (2013.01); *H04W 72/1263* (2013.01)

(58) Field of Classification Search
CPC ................................ H04W 4/30; H04W 8/245
See application file for complete search history.

(56) References Cited

U.S. PATENT DOCUMENTS

| | | | | |
|---|---|---|---|---|
| 8,654,694 | B2* | 2/2014 | Chang | H04W 52/0216 455/574 |
| 2009/0296616 | A1* | 12/2009 | Lim | H04W 52/0229 370/311 |
| 2010/0246504 | A1* | 9/2010 | Kim | H04W 76/28 370/329 |
| 2014/0018057 | A1* | 1/2014 | Yu | H04W 52/0206 455/418 |
| 2017/0041820 | A1* | 2/2017 | Wei | H04W 72/04 |
| 2020/0221381 | A1* | 7/2020 | Homchaudhuri | H04W 52/0235 |
| 2020/0314745 | A1* | 10/2020 | Yi | H04W 72/23 |
| 2021/0014791 | A1* | 1/2021 | Freda | H04W 52/0277 |
| 2021/0067209 | A1* | 3/2021 | Gopal | H04W 52/241 |
| 2021/0360674 | A1* | 11/2021 | Lim | H04W 52/0216 |

* cited by examiner

*Primary Examiner* — San Htun
(74) *Attorney, Agent, or Firm* — QUALCOMM Incorporated

(57) ABSTRACT

Methods, systems, and devices for wireless communications are described. A network entity may select a network energy saving mode from a set of network energy saving modes based on traffic conditions. The network entity may transmit a message indicating the network energy saving mode, a set of operating states corresponding to the network energy saving mode, and one or more time durations corresponding to the set of operating states, the set of operating states associated with one or more operating parameters corresponding to the one or more time durations. After transmitting the message, the network entity may activate the network energy saving mode for one or more components based on the one or more time durations. The UE may receive the message and perform one or more operations in accordance with the one or more operating parameters for the one or more time durations based on receiving the message.

28 Claims, 19 Drawing Sheets

OPERATING STATES IN GREEN NETWORK ENERGY SAVING MODES

FIELD OF TECHNOLOGY

The following relates to wireless communications, including operating states in green network energy saving modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support operating states in green network energy saving modes. For example, the described techniques enable a network entity to enter one or more network energy saving modes and enable a UE to perform one or more operations based on the network energy saving modes (e.g., to save UE and network power and maintain network operations). In some examples, a network entity may select a network energy saving mode from a set of multiple network energy saving modes for the network entity based on one or more traffic conditions at the network entity. The network entity may transmit a message (e.g., to a UE), which may indicate the selected network energy saving mode. In some cases, the message may also indicate a set of multiple operating states corresponding to the network energy saving mode and one or more time durations corresponding to the set of multiple operating states. In some examples, the plurality of operating states may be associated with one or more operating parameters that the UE may use during the one or more time durations. After transmitting the message, the network entity may activate the network energy saving mode (e.g., disable or reduce functionality for one or more components of the network entity) during the one or more time durations. In some cases, the UE may receive the message, and may perform one or more operations based on the one or more operating parameters during the one or more time durations. For example, the message may indicate one or more operating states, operating parameters corresponds to the one or more operating states, or both, and the UE may perform one or more options in accordance with the operating parameters and the one or more operating states.

A method for wireless communication at a network entity is described. The method may include selecting a network energy saving mode from a set of multiple network energy saving modes for the network entity based on one or more traffic conditions associated with the network entity, transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations, and activating, after transmitting the message, the network energy saving mode for one or more components of the network entity based on the one or more time durations.

An apparatus for wireless communication at a network entity is described. The apparatus may include a processor, memory coupled with the processor, and instructions stored in the memory. The instructions may be executable by the processor to cause the apparatus to select a network energy saving mode from a set of multiple network energy saving modes for the network entity based on one or more traffic conditions associated with the network entity, transmit a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations, and activate, after transmitting the message, the network energy saving mode for one or more components of the network entity based on the one or more time durations.

Another apparatus for wireless communication at a network entity is described. The apparatus may include means for selecting a network energy saving mode from a set of multiple network energy saving modes for the network entity based on one or more traffic conditions associated with the network entity, means for transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations, and means for activating, after transmitting the message, the network energy saving mode for one or more components of the network entity based on the one or more time durations.

A non-transitory computer-readable medium storing code for wireless communication at a network entity is described. The code may include instructions executable by a processor to select a network energy saving mode from a set of multiple network energy saving modes for the network entity based on one or more traffic conditions associated with the network entity, transmit a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations, and activate, after transmitting the message, the network energy saving mode for one or more components of the network entity based on the one or more time durations.

In some examples of the method, apparatuses, and non-transitory computer-readable medium described herein, transmitting the message may include operations, features, means, or instructions for transmitting the message indicating a first operating state of the set of multiple operating states, the first operating state indicating a silence window for the first operating state, where the silence window may be associated with a time duration of the one or more time durations and at least one operating parameter of the one or more operating parameters corresponding to the one or more time durations.

In some examples of the method, apparatuses, and non-transitory computer-readable medium described herein, the at least one operating parameter indicates a parameter set for scheduling request transmissions within the silence window and the method, apparatuses, and non-transitory computer-readable medium may include further operations, features, means, or instructions for refraining from monitoring for one or more scheduling request transmissions for the time duration based on the parameter set for scheduling request transmissions.

In some examples of the method, apparatuses, and non-transitory computer-readable medium described herein, the at least one operating parameter indicates a parameter set for scheduling request transmissions within the silence window, where the parameter set indicates one or more scheduling request occasions for scheduling request transmissions. In some examples, the method, apparatuses, and non-transitory computer-readable medium may include further operations, features, means, or instructions for monitoring for one or more scheduling request transmissions during the one or more scheduling request occasions based on the parameter set for scheduling request transmissions.

In some examples of the method, apparatuses, and non-transitory computer-readable medium described herein, the at least one operating parameter indicates that the one or more scheduling request occasions may be for data having a priority above a threshold priority.

In some examples of the method, apparatuses, and non-transitory computer-readable medium described herein, the one or more scheduling request occasions may include a first scheduling request occasion at a first time during the time duration and a second scheduling request occasion at a second time during the time duration subsequent to the first time.

In some examples of the method, apparatuses, and non-transitory computer-readable medium described herein, the at least one operating parameter indicates a parameter set for data indication transmissions within the silence window, where the parameter set indicates one or more data indication occasions for data indication transmissions. In some examples, the method, apparatuses, and non-transitory computer-readable medium may include further operations, features, means, or instructions for monitoring for one or more data indication transmissions during the one or more data indication occasions based on the parameter set for data indication transmissions.

Some examples of the method, apparatuses, and non-transitory computer-readable medium described herein may further include operations, features, means, or instructions for receiving a second message including a data indication, where the data indication indicates a presence of data at a user equipment (UE) and activating an active mode based on receiving the second message including the data indication.

In some examples of the method, apparatuses, and non-transitory computer-readable medium described herein, the data indication includes a sequence specific to the data indication.

In some examples of the method, apparatuses, and non-transitory computer-readable medium described herein, the data at the UE may be associated with a priority above a threshold priority.

In some examples of the method, apparatuses, and non-transitory computer-readable medium described herein, the at least one operating parameter indicates deactivation of a periodic or aperiodic parameter set for scheduling request transmissions within the silence window.

In some examples of the method, apparatuses, and non-transitory computer-readable medium described herein, transmitting the message may include operations, features, means, or instructions for transmitting the message indicating the set of multiple operating states, where each operating state of the set of multiple operating states may be specific to the network energy saving mode.

In some examples of the method, apparatuses, and non-transitory computer-readable medium described herein, transmitting the message may include operations, features, means, or instructions for transmitting the message indicating the set of multiple operating states, where each operating state of the set of multiple operating states may be selected from a pool of operating states available for the set of multiple network energy saving modes.

In some examples of the method, apparatuses, and non-transitory computer-readable medium described herein, transmitting the message may include operations, features, means, or instructions for transmitting the message via a downlink control information (DCI) message.

Some examples of the method, apparatuses, and non-transitory computer-readable medium described herein may further include operations, features, means, or instructions for transmitting a radio resource control (RRC) signal indicating the one or more operating parameters associated with the set of multiple operating states.

In some examples of the method, apparatuses, and non-transitory computer-readable medium described herein, transmitting the RRC signal may include operations, features, means, or instructions for transmitting the RRC signal indicating the one or more operating parameters, where the one or more operating parameters include an indication of a power control, an indication of a data hold, or both.

Some examples of the method, apparatuses, and non-transitory computer-readable medium described herein may further include operations, features, means, or instructions for transmitting an RRC signal indicating a buffer threshold corresponding to an amount of data to buffer before a scheduling request transmission.

In some examples of the method, apparatuses, and non-transitory computer-readable medium described herein, the buffer threshold may be specific to the network energy saving mode.

Some examples of the method, apparatuses, and non-transitory computer-readable medium described herein may further include operations, features, means, or instructions for transmitting a control message indicating a length of a silence window for a first operating state of the set of multiple operating states, where the control message includes one of a DCI signal or an RRC signal.

A method for wireless communication at a UE is described. The method may include receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations and performing, for the one or more time durations, one or more operations in accordance with the one or more operating parameters based on receiving the message.

An apparatus for wireless communication at a UE is described. The apparatus may include a processor, memory coupled with the processor, and instructions stored in the memory. The instructions may be executable by the processor to cause the apparatus to receive a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations and perform, for the one or more time durations, one or more operations in accordance with the one or more operating parameters based on receiving the message.

Another apparatus for wireless communication at a UE is described. The apparatus may include means for receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations and means for performing, for the one or more time durations, one or more operations in accordance with the one or more operating parameters based on receiving the message.

A non-transitory computer-readable medium storing code for wireless communication at a UE is described. The code may include instructions executable by a processor to receive a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations and perform, for the one or more time durations, one or more operations in accordance with the one or more operating parameters based on receiving the message.

In some examples of the method, apparatuses, and non-transitory computer-readable medium described herein, performing the one or more operations in accordance with the one or more operating parameters for the one or more time durations may include operations, features, means, or instructions for activating a first timer for a first time duration corresponding to a first operating state of the set of multiple operating states, performing one or more operations in accordance with one or more operating parameters corresponding to the first time duration, activating a second timer for a second time duration for a second operating state after the first timer may have expired, and performing one or more operations in accordance with one or more operating parameters corresponding to the second time duration.

Some examples of the method, apparatuses, and non-transitory computer-readable medium described herein may further include operations, features, means, or instructions for performing one or more default operations after the one or more time durations.

In some examples of the method, apparatuses, and non-transitory computer-readable medium described herein, receiving the message may include operations, features, means, or instructions for receiving the message indicating a first operating state of the set of multiple operating states, the first operating state indicating a silence window for the first operating state, where the silence window may be associated with a time duration of the one or more time durations and at least one operating parameter of the one or more operating parameters corresponding to the one or more time durations.

In some examples of the method, apparatuses, and non-transitory computer-readable medium described herein, the at least one operating parameter indicates a parameter set for scheduling request transmissions within the silence window and the method, apparatuses, and non-transitory computer-readable medium may include further operations, features, means, or instructions for refraining from transmitting one or more scheduling requests for the time duration based on the parameter set for scheduling request transmissions.

In some examples of the method, apparatuses, and non-transitory computer-readable medium described herein, the at least one operating parameter indicates a parameter set for scheduling request transmissions within the silence window, where the parameter set indicates one or more scheduling request occasions for scheduling request transmissions. In some examples, the method, apparatuses, and non-transitory computer-readable medium may include further operations, features, means, or instructions for transmitting one or more scheduling requests during the one or more scheduling request occasions based on the parameter set for scheduling request transmissions.

In some examples of the method, apparatuses, and non-transitory computer-readable medium described herein, the at least one operating parameter indicates that the one or more scheduling request occasions may be for data having a priority above a threshold priority.

In some examples of the method, apparatuses, and non-transitory computer-readable medium described herein, the one or more scheduling request occasions may include a first scheduling request occasion at a first time during the time duration and a second scheduling request occasion at a second time during the time duration subsequent to the first time.

In some examples of the method, apparatuses, and non-transitory computer-readable medium described herein, the at least one operating parameter indicates a parameter set for data indication transmissions within the silence window, where the parameter set indicates one or more data indication occasions for data indication transmissions. In some examples, the method, apparatuses, and non-transitory computer-readable medium may include further operations, features, means, or instructions for transmitting one or more data indications during the one or more data indication occasions based on the parameter set for data indication transmissions.

In some examples of the method, apparatuses, and non-transitory computer-readable medium described herein, transmitting the one or more data indications may include operations, features, means, or instructions for transmitting a second message including a data indication, where the data indication indicates a presence of data at a UE.

In some examples of the method, apparatuses, and non-transitory computer-readable medium described herein, the data indication includes a sequence specific to the data indication.

In some examples of the method, apparatuses, and non-transitory computer-readable medium described herein, the data at the UE may be associated with a priority above a threshold priority.

In some examples of the method, apparatuses, and non-transitory computer-readable medium described herein, the at least one operating parameter indicates deactivation of a periodic or aperiodic parameter set for scheduling request transmissions within the silence window.

In some examples of the method, apparatuses, and non-transitory computer-readable medium described herein, receiving the message may include operations, features, means, or instructions for receiving the message indicating the set of multiple operating states, where each operating state of the set of multiple operating states may be specific to the network energy saving mode.

In some examples of the method, apparatuses, and non-transitory computer-readable medium described herein, receiving the message may include operations, features, means, or instructions for receiving the message indicating the set of multiple operating states, where each operating state of the set of multiple operating states may be selected from a pool of operating states available for a set of multiple network energy saving modes including the network energy saving mode.

In some examples of the method, apparatuses, and non-transitory computer-readable medium described herein, receiving the message may include operations, features, means, or instructions for receiving the message via a DCI message.

Some examples of the method, apparatuses, and non-transitory computer-readable medium described herein may further include operations, features, means, or instructions for receiving an RRC signal indicating the one or more operating parameters associated with the set of multiple operating states.

In some examples of the method, apparatuses, and non-transitory computer-readable medium described herein, receiving the RRC signal may include operations, features, means, or instructions for receiving the RRC signal indicating the one or more operating parameters, where the one or more operating parameters include an indication of a power control, an indication of a data hold, or both.

Some examples of the method, apparatuses, and non-transitory computer-readable medium described herein may further include operations, features, means, or instructions for receiving an RRC signal indicating a buffer threshold corresponding to an amount of data to buffer before a scheduling request transmission and transmitting a scheduling request based on an amount of data at a UE being greater than the buffer threshold.

In some examples of the method, apparatuses, and non-transitory computer-readable medium described herein, the buffer threshold may be specific to the network energy saving mode.

Some examples of the method, apparatuses, and non-transitory computer-readable medium described herein may further include operations, features, means, or instructions for receiving a control message indicating a length of a silence window for a first operating state of the set of multiple operating states, where the control message includes one of a DCI signal or an RRC signal.

DETAILED DESCRIPTION

Figure 1:
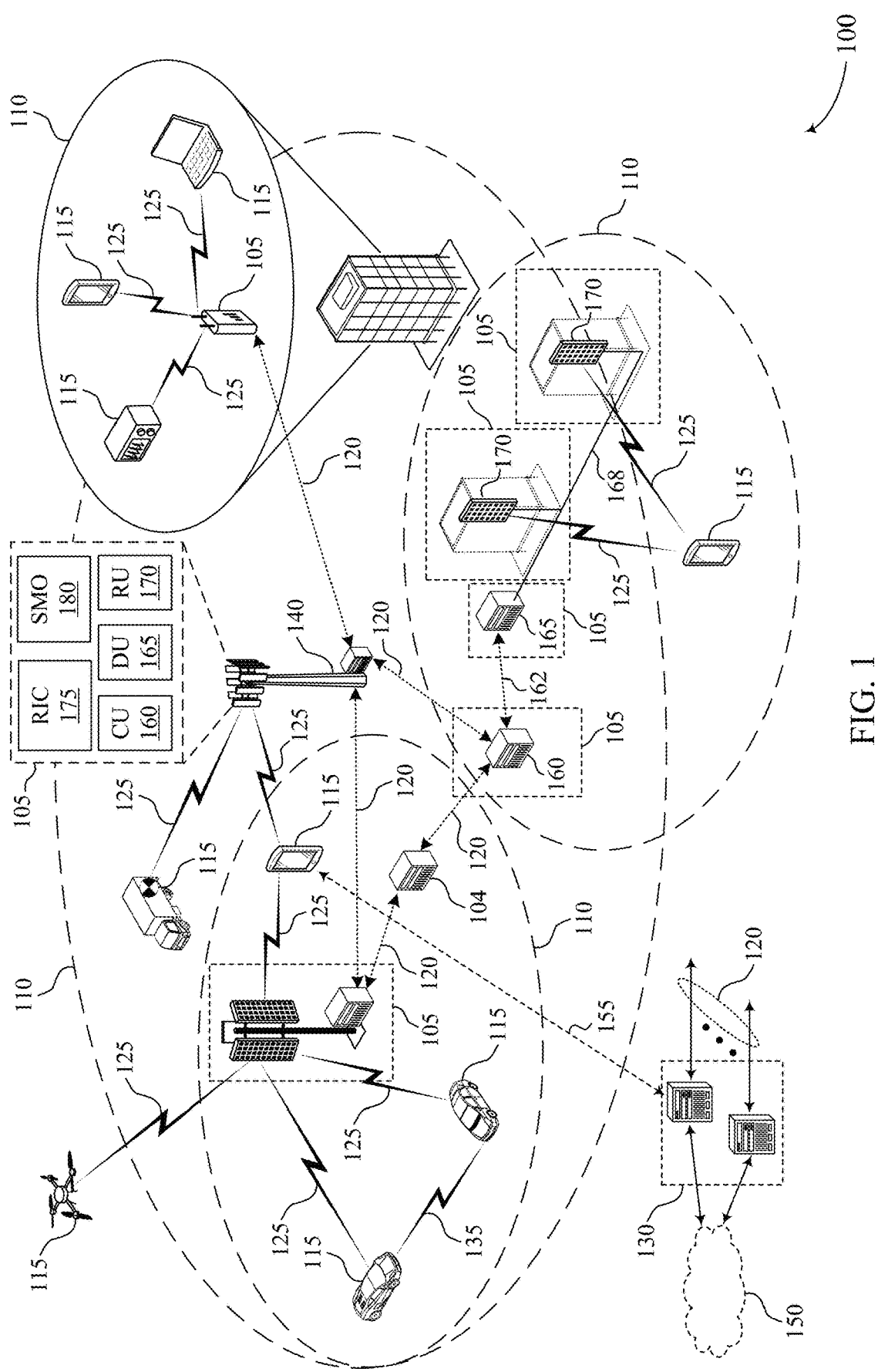
FIG. 1 illustrates an example of a wireless communications system that supports operating states in green network energy saving modes in accordance with one or more aspects of the present disclosure.

In some examples, a network entity may use different modes and operations to save power and maintain network operations. For example, based on traffic conditions, the network entity may decide to perform network energy saving and operate according to one or more network energy saving modes, which may correspond to different activity levels or functionality for one or more components of the network entity. An example of a network saving mode may be a sleep mode such as a deep sleep mode in which the network entity may turn off a majority of communication components (e.g., for a given time) and in some cases, may not be configured to service or provide support for any wireless devices in communication with the network entity (e.g., the network entity may not transmit or receive communications from any user equipments (UE) in communication with the network entity). Another example of a network saving mode may be a light sleep mode where the network entity may turn off a portion of communication components or reduce functionality for one or more components. In the light sleep mode, the network entity may serve a reduced number of UEs or communications (e.g., UEs or communications having a priority greater than a threshold) than in a non-sleep (e.g., active) mode, but more UEs or communications than in a deep sleep mode. The network entity may thus conserve different amounts of power in different network energy saving modes. In some cases, the network entity may transition from a network energy saving mode to an active mode based on a request from a UE. In some examples, a UE may transmit the request soon after the network entity has entered the network energy saving mode, which may limit the amount of power savings at the network.

The techniques described herein enable a network entity to be configured with multiple operating states for a network energy saving mode, where the operating states may include corresponding UE behavior to enable the network entity to remain in a network energy saving mode to save power. For example, the network entity may select a network energy saving mode based on current or expected traffic at the network entity. The selected network energy saving mode may be associated with multiple operating states for the network entity, where each operating state may be configured with a respective time duration and associated with one or more parameters for a UE to use when the network entity is operating in the network energy saving mode. The network entity may transmit a message indicating the selected network energy saving mode and the multiple operating states to the UE, where the UE may operate according to the respective time duration and the one or more parameters for each operating state during the network energy saving mode. After transmitting the message, the network entity may activate the network energy saving mode. In one example, the UE may operate according to the one or more parameters for each duration of time according to one or more timers. In another example, the UE may apply different procedures associated with the one or more parameters for each operating state, and may transition to a next operating state after completing the different procedures.

In some examples, the message may indicate a first operating state, where the first operating state may indicate a silence window where the network entity may experience less or no communication with the UE. For example, after indicating multiple operating states including the first operating state as a silence window and multiple time durations including a first time duration corresponding to the silence window, the network entity may activate the silence window for the first time duration, where the network entity may refrain from monitoring for one or more scheduling requests from UEs. The UE may correspondingly refrain from transmitting scheduling requests during the first time duration. In some examples, the UE may transmit scheduling requests when one or more conditions are met. For example, the UE may be configured (e.g., by the network entity) to transmit scheduling requests during one or more scheduling request occasions during the silence window, and the network entity may monitor for scheduling requests during the one or more scheduling request occasions. Additionally, or alternatively, the UE may be configured to transmit data indications during one or more data indication occasions during the silence window, and the network entity may monitor for data indications during the one or more data indication occasions.

Aspects of the disclosure are initially described in the context of wireless communications systems. Aspects of the disclosure are then described in the context of timelines and process flows. Aspects of the disclosure are further illustrated by and described with reference to apparatus diagrams, system diagrams, and flowcharts that relate to operating states in green network energy saving modes.

FIG. 1 illustrates an example of a wireless communications system 100 that supports operating states in green network energy saving modes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support operating states in green network energy saving modes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User internet protocol (IP) packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (industrial, scientific, and medical (ISM)) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A physical (PHY) layer may map transport channels to physical channels.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

Some wireless communications systems 100 may include network entities 105 which support power savings, for example, in 5G wireless communications and massive MIMO systems (e.g., green networks). In some examples, a network entity 105 may support different energy saving modes, such as sleep modes (e.g., light sleep mode, deep sleep mode), and other operations to save power and maintain network operations. For example, the network entity 105 may turn off or reduce some capabilities or components while in a particular sleep mode to save power. As such, the network entity 105 may enter a different sleep mode depending on what capabilities the network entity 105 turns off. In some cases, the network entity 105 may enter a sleep mode such as a micro-sleep or milli-sleep mode, a light sleep mode, a deep sleep mode, or a full sleep mode, where the closer a particular sleep mode is to the full sleep mode, the lower the power consumption of the network entity 105.

Whether a network entity 105 enters a relatively light sleep mode or a relatively deep sleep mode may depend on traffic corresponding to one or more UEs 115 communicating with or supported by the network entity 105. For example, if the network entity 105 is communicating with multiple UEs 115 with heavy traffic loads (traffic above a threshold traffic amount), then the network entity 105 may refrain from entering any sleep mode. In some other examples, if the network entity 105 is communicating with a few UEs 115 with light traffic loads (traffic below a threshold traffic amount), then the network entity 105 may enter a light sleep mode. If the network entity 105 does not have communications scheduled or expected with any UEs 115, then the network entity 105 may enter a deep sleep mode or a full sleep mode (e.g., the network entity 105 or one or more components of the network entity 105 may be turned off completely). As such, the network entity 105 may enter a given sleep mode based on a quantity of UEs 115 communicating with the network entity 105, or the traffic or network load corresponding to the UEs 115 (e.g., the UEs 115 may have higher traffic loads in the middle of the day than at midnight), among other factors.

In some examples, the wireless communications system 100 may support techniques for a UE 115 to transmit, to a network entity 105, information about expected traffic for transmission by the UE 115, which may assist the network entity 105 in determining whether to enter a sleep mode, which sleep mode to enter, which components of the network entity 105 are to enter sleep mode, etc. In some examples, the UE 115 may transmit one or more messages to the network entity 105 indicating a duration of time before expected traffic may be available for transmission at the UE 115 and an expected size (e.g., quantity of bits) associated with the expected traffic. The one or more messages may include a UAI message or a buffer status report (BSR) message. For example, the UE 115 may receive a control message indicating a configuration for a field of a BSR associated with the expected traffic and indicating the duration of time, the size of the associated traffic, or both. In some examples, the UE 115 may receive a response message from the network entity 105 indicating that the network entity 105 is to enter a sleep mode during a time period based on the duration of time and the size of the associated traffic. For example, if the duration of time before the expected traffic is available for transmission at the UE 115 is above a threshold time, the UE 115 may receive a response message indicating that the network entity 105 is to enter a given sleep mode, and the network entity 105 may enter the sleep mode accordingly.

In some examples, sleep modes may differ in terms of operation. For example, in some sleep modes, the network entity 105 may turn off radio frequency chains, may serve less UEs 115, or may include less communications with UEs 115. Additionally, different sleep modes may result in different power consumption and different transition times for the network entity 105 to transition from a particular power consumption (e.g., in a legacy operation) to a particular sleep mode. For example, in a light sleep mode, the network entity 105 may turn off some antennas and other features at an RU 170 of the network entity 105 such that the consumption power of the network entity 105 may transition into and out of the light sleep mode over a relatively short transition time. In a deep sleep mode, the network entity 105 may turn off more capabilities at the network entity 105 as compared to a lighter sleep mode, and as such, the network entity 105 may save more power but may use a longer transition time to transition into and out of the deep sleep mode.

In some examples, a UE 115 may transmit a message to a network entity 105 indicating for the network entity 105 to transition to an active or "awake" mode. For example, the UE 115 may receive or generate some data for transmitting to the network entity 105, and may transmit a scheduling request based on the data. The network entity 105 may respond to the scheduling request by transitioning to an active mode or lighter sleep mode to be able to serve the UE 115 according to the scheduling request. Additionally, or alternatively, the UE 115 may transmit a wake up signal to the network entity 105. In some examples, the UE 115 may transmit the indication for the network entity 105 to transition to the active mode soon after the network entity 105 enters a sleep mode. For example, the UE 115 may transmit a scheduling request immediately following a transition time for the network entity 105 to enter a sleep mode. The scheduling request may prompt the network entity 105 to transition back to an active mode soon after transitioning to the sleep mode, leading to lost power savings and inefficiency in communications.

Techniques described herein may provide methods for improving power saving in green network energy saving modes by enabling a network entity 105 to employ different operating states while in an energy saving mode. In some examples, a network entity 105 may select a network energy saving mode (e.g., a sleep mode) to enter based on one or more factors (e.g., information about expected traffic). The network entity 105 may transmit a message to a UE 115 indicating the selected network energy saving mode, one or more operating states for the selected network energy saving mode, and a respective time duration for each operating state. The UE 115 may additionally perform different operations or behaviors during each operating state for each respective time duration. In some examples, the one or more operating states may include a silence window at the beginning of the energy saving mode, where the UE 115 may refrain from transmitting communications. For example, the UE 115 may refrain from transmitting scheduling requests during a time duration for the silence window, or may transmit scheduling requests at one or more scheduling request occasions. Additionally, or alternatively, the network entity 105 may refrain from monitoring during the silence window, or may monitor for scheduling requests during the one or more scheduling request occasions. Additionally, or alternatively, the UE 115 may transmit one or more indications of data at the UE 115 to the network entity 105 during the silence window. In some cases, the network entity 105 may transition to a default operating state after the silence window and the UE 115 may perform one or more default operations during the default operating state.

In some cases, the UE 115 may include, or the network entity 105 may indicate, a configuration for scheduling requests, where the configuration may be periodic or aperiodic and may define how often or when the UE 115 may transmit scheduling requests. In some cases, the UE 115 may wait to transmit messages to the network entity 105 until the UE 115 has a quantity of data above a threshold. For example, the UE 115 may accumulate data and refrain from transmitting scheduling requests during the silence window. If the data reaches above a threshold, the UE 115 may transmit a scheduling request to the network entity 105, where the network entity 105 may transition to an active mode to receive the data from the UE 115. In some cases, the methods described herein may enable the network entity to achieve increased power saving by avoiding interruption from UEs 115 and other devices (e.g., during the silence window). For example, a silence window as described herein may disable communications for a given amount of time (e.g., the time duration for the silence window) or lessen the chance of the network entity 105 waking up at the beginning of each sleep mode, allowing a network entity 105 to achieve a relative minimum amount of power saving.

Figure 2:
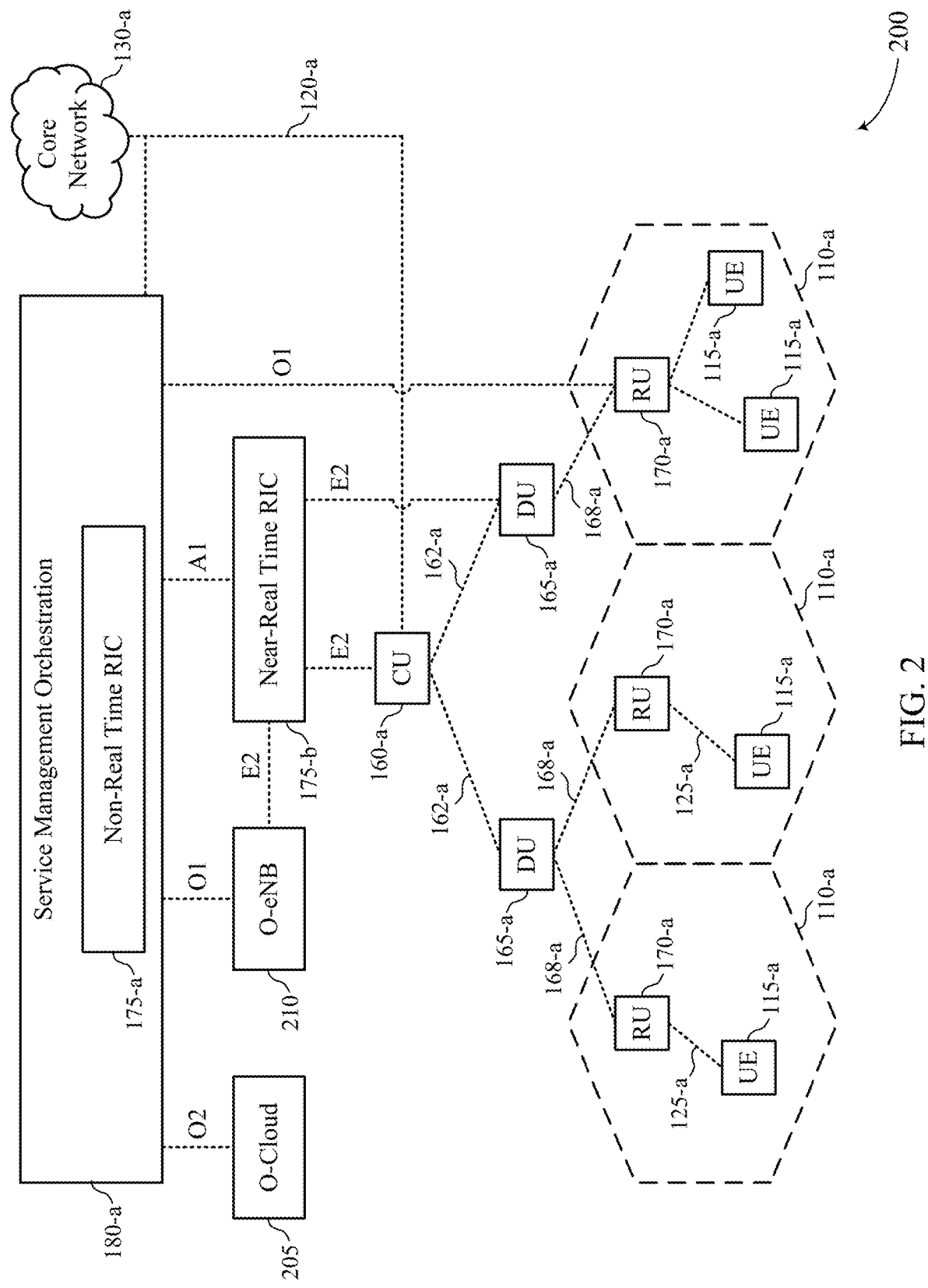
FIG. 2 illustrates an example of a network architecture that supports operating states in green network energy saving modes in accordance with one or more aspects of the present disclosure.

FIG. 2 illustrates an example of a network architecture 200 (e.g., a disaggregated base station architecture, a disaggregated RAN architecture) that supports operating states in green network energy saving modes in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may communicate with respective UEs 115-*a* via one or more communication links 125-*a*. In some implementations, a UE 115-*a* may be simultaneously served by multiple RUs 170-*a*. In some examples, a network entity 105 may support a coverage area 110-*a* (e.g., a geographic coverage area) over which the UEs 115 and RUs 170-*a* may establish one or more communication links 125-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for forward error correction (FEC) encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

The network architecture 200 may support techniques for a network entity 105 to include one or more operating states for one or more network energy saving modes, and for a UE 115-a to perform one or more operations for each respective operating state of each network energy saving mode. Such operations may assist the network entity 105 in determining when one or more components of the network entity 105 are to exit a sleep mode or enter a lighter sleep mode. In some examples, the network entity 105 may select a network energy saving mode (e.g., a sleep mode, such as deep sleep, light sleep, full sleep, etc.) for one or more components associated with the network entity 105 (RU 170-a, DU 165-a, etc.) based on one or more traffic conditions associated with the network entity 105 (e.g., time period and the size associated with expected traffic). For instance, the network entity 105 may determine to enter a light sleep mode, and in doing so, may reduce power consumption by turning off particular antennas (e.g., turning off at least some capabilities of the RU 170-a) and performing fewer OTA communications with the UE 115-a.

The UE 115-a may receive a message indicating the selected network energy saving mode, one or more operating states for the network energy saving mode, and one or more time durations for the one or more operating states. In some cases, each operating state may include one or more respective operating parameters for each time duration. The network energy saving mode may be selected at, and the one or more operating states and one or more time durations may be configured at, the CU 160 a (or DU 165-a) of the network entity 105, and the message may be transmitted (e.g., OTA) by the RU 170-a of the network entity 105. In some examples, the network entity 105 may activate the selected network energy saving mode for the one or more components associated with the network entity 105 after transmitting the message to the UE 115-a. Based on the operating parameters and information in the message, the UE 115-a may perform one or more operations for each respective time duration for each operating state. In some cases, the one or more operating parameters may be preconfigured at the UE 115-a, or may be received by a message (e.g., RRC) from the RU 170-a. In some examples, the UE 115-a may receive an RRC message configuring the one or more operating parameters before the network entity 105 selects the network energy saving mode.

Figure 3:
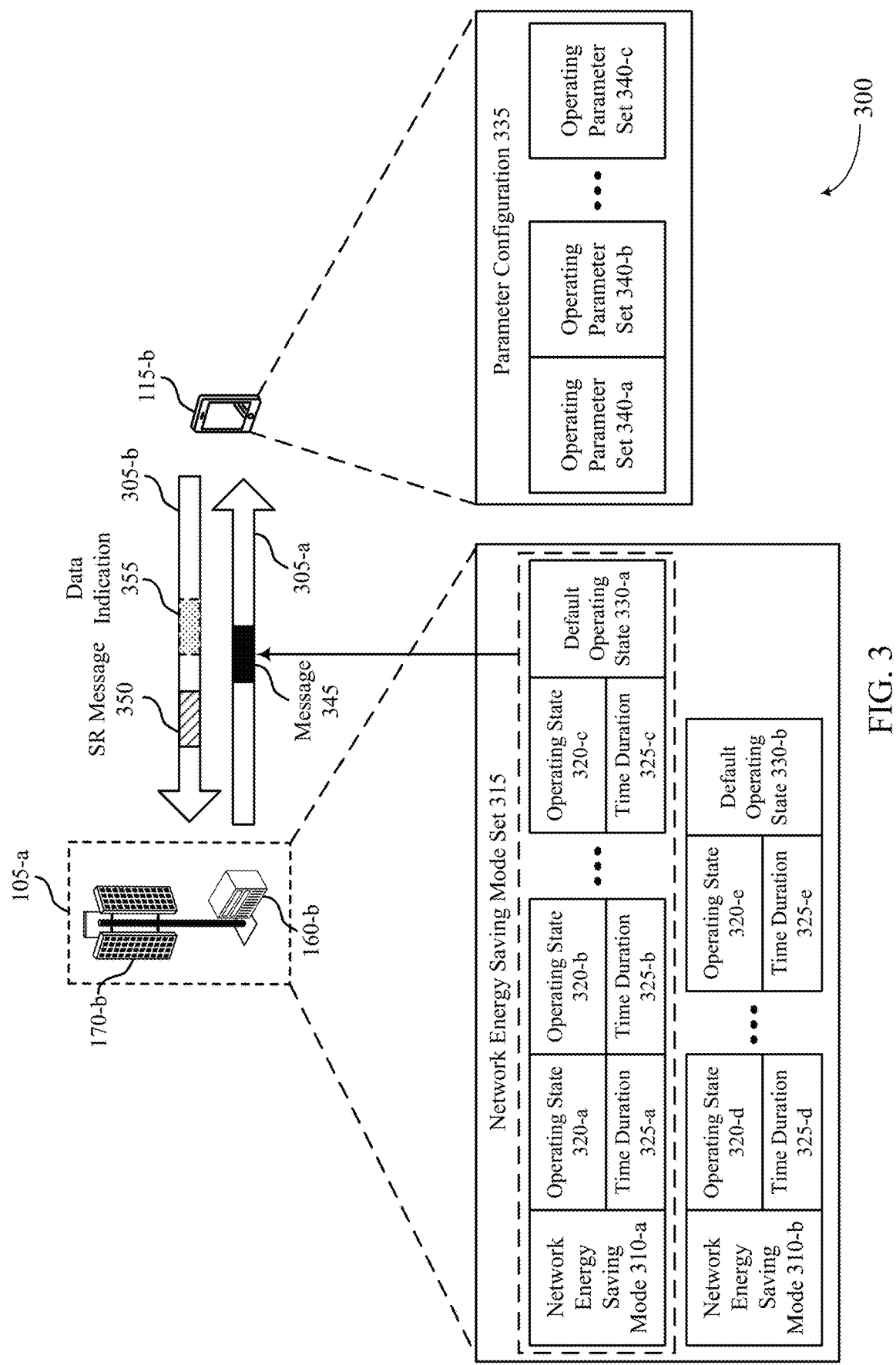
FIG. 3 illustrates an example of a wireless communications system that supports operating states in green network energy saving modes in accordance with one or more aspects of the present disclosure.

FIG. 3 illustrates an example of a wireless communications system 300 that supports operating states in green network energy saving modes in accordance with one or more aspects of the present disclosure. In some examples, the wireless communications system 300 may implement aspects of the wireless communications system 100 or may be implemented by aspects of the wireless communications system 100. For example, the wireless communications system 300 may include a UE 115-b and a network entity 105-a, which may be examples of corresponding devices described herein. The network entity 105-a may include a CU 160-b and an RU 170-b in a disaggregated RAN architecture, where the CU 160-*b* and the RU 170-*b* may be components co-located or located in distributed locations (e.g., separate physical locations). In some examples, the UE 115-*b* may communicate with the network entity 105-*a* via a communications link 305-*a* (e.g., a downlink) and a communications link 305-*b* (e.g., an uplink). For example, the UE 115-*b* may communicate with the RU 170-*b* of the network entity 105-*a* via the communications link 305-*a* and the communications link 305-*b*. In addition, the network entity 105-*a* may communicate with multiple UEs 115 including the UE 115-*b*.

In some examples, the network entity 105-*a* may be aware of current traffic conditions corresponding to the UE 115-*b*. That is, the network entity 105-*a* may know the traffic conditions at a given time, and may be communicating with the UE 115-*b*. In some cases, the network entity 105-*a* may select a network energy saving mode 310-*a* (e.g., a sleep mode) to enter based on the traffic conditions and communications with the UE 115-*b*. For example, the UE 115-*b* may indicate, via the communications link 305-*b*, statistical information indicating that the UE 115-*b* (and other UEs 115) will have zero to low traffic during a later duration of time. In some examples, the statistical information may additionally include a size associated with the expected traffic (e.g., a quantity of bits in the expected traffic). Based on the duration and size indicated by the UE 115-*b*, the network entity 105-*a* may select to activate the network energy saving mode 310-*a*. In some cases, the network energy saving mode 310-*a* may be an example of a sleep mode (e.g., a deep sleep mode).

In some examples, the network entity 105-*a* may select the network energy saving mode 310-*a* from a network energy saving mode set 315, where the network saving mode set 315 may include one or more network energy saving modes 310. For example, the network energy saving mode set 315 may include the network energy saving mode 310-*a* and a network energy saving mode 310-*b*. In some examples, the network energy saving modes 310 may represent one or more sleep modes as described herein. For example, the network energy saving mode 310-*a* may be a light sleep mode, and the network energy saving mode 310-*b* may be a deep sleep mode.

In some cases, each network energy saving mode 310 may include corresponding operating states 320, time durations 325, default operating states 330, or a combination thereof. For example, the network energy saving mode 310-*a* may include operating state 320-*a* through operating state 320-*c* and any intervening operating states 320, as well as time duration 325-*a* through time duration 325-*c* and any intervening time durations 325. In some cases, each time duration 325 may correspond to a respective operating state 320, and may indicate how long the network entity 105-*a* may remain in a respective operating state 320 during a corresponding network energy saving mode 310. For example, in the network energy saving mode 310-*a*, the network entity 105-*a* may first transition to the operating state 320-*a*, and after the time duration 325-*a*, the network entity 105-*a* may transition to the operating state 320-*b* for the time duration 325-*b*, and so on. The network energy saving mode 310-*a* may additionally include a default operating state 330-*a*, where the network entity 105-*a* may transition to the default operating state 330-*a* after the operating state 320-*c*. In some cases, the network entity may remain in the default operating state 330-*a* for a remaining time duration of a total time duration for the network energy saving mode 310-*a*. In some cases, the network entity 105-*a* may run corresponding timers for each time duration 325. Similarly, the network energy saving mode 310-*b* may include operating state 320-*d* through operating state 320-*e* and any intervening operating states 320, time duration 325-*d* through time duration 325-*e* and any intervening time durations 325, and a default operating state 330-*b*.

In some examples, each operating state 320 may be associated with different behavior for the UE 115-*b*. For example, the UE 115-*b* may be configured with a parameter configuration 335, which may include one or more operating parameter sets 340. Each operating parameter set may include one or more parameters defining different operations for the UE 115-*b* to perform during each of the operating states 320-*a* through 320-*c*. For example, the UE 115-*b* may include operating parameter sets 340-*a*, 340-*b*, and 340-*c*, and any intervening operating parameter sets 340, which may correspond to the operating states 320-*a*, 320-*b*, and 320-*c*, and any intervening operating states 320, respectively. In some examples, the UE 115-*b* may include additional operating parameter sets 340 corresponding to the operating states 320-*d* through 320-*e* and any intervening operating states. In some cases, each operating state 320 may include respective behavior or operations for the network entity 105-*a* as well.

In some examples, operations defined by the parameters in each parameter set 340 may include power control operations, data hold operations, scheduling request configurations, data indication operations including high priority data indications, etc. as described with reference to FIGS. 4-7. In some examples, the default operating states 330 may correspond to one or more default operations for the UE 115-*b* as defined in a respective operating parameter set 340. For example, an operating parameter set 340 of the parameter configuration 335 may include a default operating parameter set, where the default operating parameter set may correspond to the default operating state 330-*a*. In some examples, the network entity 105-*a* may configure the UE 115-*b* with the parameter configuration 335. For example, at a time before transmitting the message 345, the network entity 105-*a* may transmit an RRC message to the UE 115-*b* configuring the one or more operating parameter sets 340 at the UE 115-*b*. Additionally, or alternatively, the UE 115-*b* may be preconfigured with the parameter configuration 335 including the one or more operating parameter sets 340.

In some examples, the network energy saving modes 310 may share common operating states 320 and corresponding time durations 325. For example, the network energy saving mode 310-*a* may include the operating state 320-*a*, the operating state 320-*b*, and the operating state 320-*c*, and the corresponding time durations 325-*a*, 325-*b*, and 325-*c*. The network energy saving mode 310-*b* may similarly include the operating state 320-*a* and the operating state 320-*b* and the corresponding time durations 325-*a* and 325-*b*, where the operating states 320-*d* and 320-*e* may represent the operating states 320-*a* and 320-*b*, and the time durations 325-*d* and 325-*e* may represent the time durations 325-*a* and 325-*b*, respectively. In some cases, the parameter configuration 335 may include the operating parameter sets 340 corresponding to the common operating states 320 and the corresponding time durations 325 (e.g., the operating parameter sets 340-*a*, 340-*b*, and 340-*c*). In some examples, the operating states 320 and time durations 325 may be specific to each network energy saving mode 310. For example, the operating states 320-*a*, 320-*b*, and 320-*c* may be different from the operating states 320-*d* and 320-*e*, and the time durations 325-*a*, 325-*b*, and 325-*c* may be different from the time durations 325-*d* and 325-*e*. In some cases, the parameter configuration 335 may include different operating parameter sets 340 for each specific operating state and time duration. For example, the parameter configuration 335 may include the operating parameter sets 340-a, 340-b, and 340-c corresponding to the time durations 325-a through 325-c, and may include additional operating parameter sets 340 corresponding to the time durations 325-d through 325-e.

In some examples, the network entity 105-a may select the operating states for each network energy saving mode 310. For example, the network entity 105-a may select and assign the operating states 320-a through 320-c to the network energy saving mode 310-a, and may select and assign the operating states 320-d through 320-e to the network energy saving mode 310-b. Similarly, the network entity 105-a may select and assign time durations 325 and default operating states 330 to each respective network energy saving mode 310. In some cases, the network entity 105-a may select the operating states 320, the time durations 325, and the default operating states 330 from a pool of common operating states 320, time durations 325, and default operating states 330 (e.g., for sharing across multiple network energy saving modes 310). In some examples, the selections may be based on expected traffic at the UE 115-b or other network conditions. In some cases, the network entity 105-a may determine specific operating states 320, time durations 325, default operating states 330, or any combination thereof for each network energy saving mode 310 based on current or expected traffic at the UE 115-b or other network conditions (e.g., number of users or devices, coverage area size).

In some examples, after selecting the network energy saving mode 310-a, the network entity 105-a may indicate the selected network energy saving mode 310-a to the UE 115-b in the message 345. For example, the network entity 105-a may transmit the message 345 to the UE 115-b via the communications link 305-a. The message 345 may indicate the selected network energy saving mode 310-a, as well as the operating states 320-a through 320-c, the time durations 325-a through 325-c, and the default operating state 330-a. In some examples, the network entity 105-a may transmit the message 345 via different communication formats. For example, the message 345 may include an RRC configuration, where the UE 115-b may receive the message 345 before the network entity 105-a enters the network energy saving mode 310-a, and may perform one or more operations during the network energy saving mode 310-a according to the RRC configuration. In some cases, the message 345 may indicate a set of selected network energy saving modes that the network entity 105-a selects to enter and corresponding operating states 320, time durations 325, and default operating states 330. In some cases, the network entity 105-a may transmit the entirety of, or elements of, the message 345 and other messages 345 dynamically.

In some examples, the UE 115-b may perform one or more operations for each operating state 320 based on the information included in the message 345. For example, the network entity 105-a may transition into the network energy saving mode 310-a (e.g., a light sleep mode) after transmitting the message 345 to the UE 115-b. Based on the network energy saving mode 310-a indicated by the message 345, the UE 115-b may select one or more operating parameter sets 340 from the parameter configuration 335 corresponding to the network energy saving mode 310-a. For example, the UE 115-b may select the operating parameter set 340-a through the operating parameter set 340-c. Based on the selected operating parameter sets 340-a through 340-c, the UE 115-b may perform one or more operations as described herein (e.g., power control, data hold, scheduling requests, data indications, etc.). In some examples, the UE 115-b may also select an operating parameter set 340 including a default operating parameter set, where the default operating parameter set may correspond to the default operating state 330-a.

In some cases, the UE 115-b may transition between operating states based on the information from the message 345. For example, the message 345 may indicate the time duration 325-a through the time duration 325-c. In some cases, the UE 115-b may activate a first timer for the time duration 325-a, and may perform one or more operations as defined by the operating parameter set 340-a. After the first timer expires, the UE 115-b may transition to the operating state 320-b, and may activate a second timer and perform one or more operations defined by the operating parameter set 340-b. In some examples, the UE 115-b may transition between operating states 320 based on completing one or more operations corresponding to each operating state 320 for the network energy saving mode 310-a indicated in the message 345. For example, the UE 115-b may perform one or more operations indicated by the operating parameter set 340-a for the operating state 320-a. Once the UE 115-b completes the one or more operations, the UE 115-b may transition to the operating state 320-b. After completing one or more operations for the operating state 320-b, the UE 115-b may transition to any subsequent operating states 320 up to the operating state 320-c after performing respective operations for each operating state 320. In some cases, the message 345 may not indicate the time durations 325 (e.g., when the UE 115-b transitions based on completing operations instead of based on timers). In some cases, the message 345 may indicate respective timers for each operating state 320, and in other cases, the UE 115-b may be preconfigured with the respective timers, or may configure timers according to the time durations 325-a through 325-c indicated in the message 345.

In some cases, the UE 115-b may be preconfigured with the operating states 320, the time durations 325, and the default operating states 330 for each energy saving mode 310. For example, the message 345 may include an indication of the selected network energy saving mode 310-a, but may not include an indication of the operating the operating states 320-a through 320-c, the time durations 325-a through 325-c, or the default operating state 330-a. Based on the network energy saving mode 310-a indicated in the message 345, the UE 115-b may perform one or more operations according to the operating parameter sets 340-a through 340-c based on the operating states 320-a through 320-c, the time durations 325-a through 325-c, and the default operating state 330-a being preconfigured at the UE 115-b. In some cases, the UE 115-b may be preconfigured with all operating states 320, time durations 325, and default operating states 330 for each network energy saving mode 310 so that the network entity 105-a may indicate any selected network energy saving mode 310, and the UE 115-b may perform accordingly.

In some cases, dynamic indication of the message 345 may include transmitting elements of the message 345 for each operating state transition of the network entity 105-a. For example, the network entity 105-a may transition to an operating state 320-b during the network energy saving mode 310-a, and may transmit downlink control information (DCI) indicating the operating state transition to the UE 115-b. In some examples, the DCI may include an indication of the operating state 320-b. The UE 115-b may subsequently perform one or more operations for the operating state 320-b (e.g., based on the operating parameter set 340-b) until the reception of a next DCI. The network entity 105-*a* may transition to the operating state 320-*c*, may transmit a DCI indicating the transition, and the UE 115-*b* may perform one or more operations for the operating state 320-*c*. In some cases, the dynamic signaling may also indicate corresponding time durations 325 or operating parameter sets 340. In some cases, the UE 115-*b* may perform one or more operations for each state based on the time durations 325 indicated dynamically. For example, the network entity may indicate the operating state 320-*b* and the time duration 325-*b*, and the UE 115-*b* may perform one or more operations for the time duration 325-*b*, and may resume default behavior after the completion of the time duration 325-*b*. In such examples, the UE 115-*b* may perform one or more operations according to the dynamic signaling to save power at the UE 115-*b* as well as the network entity 105-*a*. For example, the UE 115-*b* may perform one or more power control, scheduling request, data indication, or other operations as described with reference to FIGS. 4-7.

In some examples, the operating state 320-*a* may be a silence window, where communications between the UE 115-*c* and the network entity 105-*b* may be decreased. For example, based on the operating parameter set 340-*a*, the UE 115-*b* may refrain from transmissions during the operating state 320-*a*, including refraining from transmitting scheduling requests as described with reference to FIG. 4. By way of another example, based on the operating parameter set 340-*a*, the UE 115-*c* may transmit one or more scheduling requests based on one or more conditions being met. For example, the UE 115-*b* may transmit one or more scheduling requests based on a scheduling request configuration or based on a presence of high priority data as described in further detail with reference to FIG. 5. In some cases, the UE 115-*b* may transmit the scheduling requests during the operating state 320-*a* via one or more scheduling request messages 350 transmitted to the network entity 105-*a*. Additionally, or alternatively, the UE 115-*c* may transmit one or more data indications as described in further detail with reference to FIG. 6. For example, the UE 115-*c* may transmit the data indication 355 to the network entity 105-*b* during the operating state 320-*a*, where the data indication 355 may indicate a presence of data or high priority data in an uplink queue of the UE 115-*b*.

In some cases, the silence window described herein may enable the network entity 105-*a* to save a greater amount of energy. For example, the silence window may enable a minimum amount of power saved at the beginning of a sleep mode (e.g., the network energy saving mode 310-*a*). In some examples, the UE 115-*b* may transmit the scheduling request message 350 or the data indication 355 during any of the operating states 320 based on corresponding operating parameter sets 340. In some examples, the UE 115-*b* may transmit scheduling requests and data indications within time periods defined by the time durations 325. In some examples, the network entity 105-*b* may refrain from monitoring for transmissions including scheduling requests, or may monitor for the scheduling request message 350 or the data indication 355 during the operating state 320-*a*. In some examples, the network entity 105-*b* may indicate the length of the silence window (e.g., the time duration 420-*a*) through RRC signaling or dynamically as described herein.

Figure 4:
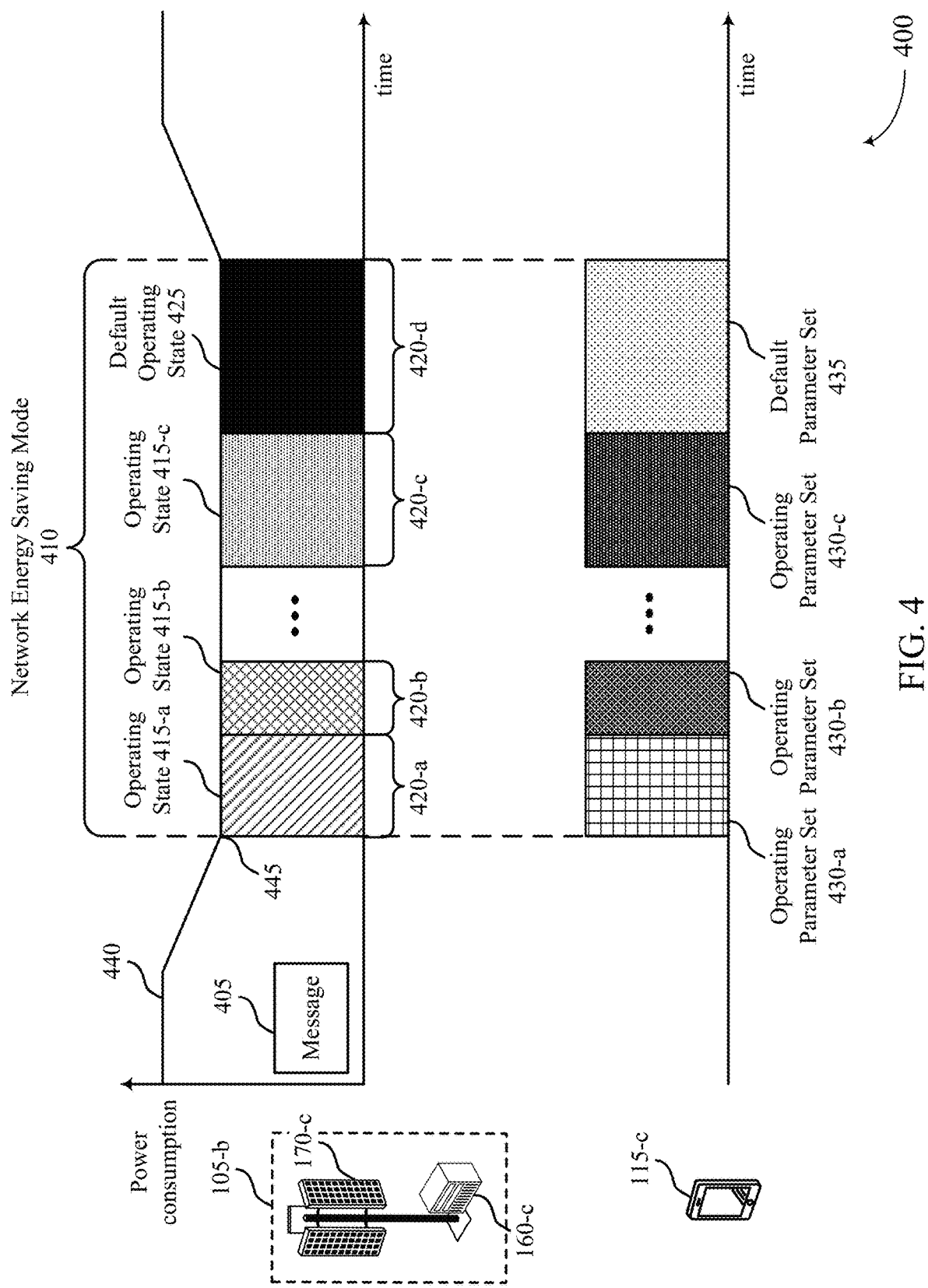
FIG. 4 illustrates an example of a timeline that supports operating states in green network energy saving modes in accordance with one or more aspects of the present disclosure.

FIG. 4 illustrates an example of a timeline 400 that supports operating states in green network energy saving modes in accordance with one or more aspects of the present disclosure. In some examples, the timeline 400 may implement or be implemented by aspects of the wireless communications systems 100 and 300. For example, a UE 115-*c* and a network entity 105-*b* (including a CU 160-*c* and an RU 170-*c*) may communicate in accordance with the timeline 400, where the network entity 105-*b* may indicate a selected network energy saving mode to the UE 115-*c*, and the UE 115-*c* may perform one or more operations based on the indicated network energy saving mode.

In some examples, the network entity 105-*b* may decide to enter a network energy saving mode 410 based on one or more traffic conditions or other data as described with reference to FIG. 3. For example, the network entity 105-*b* may receive one or more messages from the UE 115-*c* indicating expected traffic, and may select the network energy saving mode 410 from a pool of possible network energy saving modes. In some examples, the network entity 105-*b* may operate at a power consumption level 450, which may be a relatively nominal power consumption for the network entity 105-*b*.

As described herein, after selecting the network energy saving mode 410, the network entity 105-*b* may transmit a message 405 to the UE 115-*c*. A message 405 may indicate the network energy saving mode 410, one or more operating states 415 for the network energy saving mode 410, one or more time durations 420 corresponding to the one or more operating states 415, and a default operating state 425 as described with reference to FIG. 3. In some examples, the UE 115-*c* may be configured with one or more operating parameter sets 430 and a default parameter set 435 as described with reference to FIG. 3. After transmitting the message 405, the network entity 105-*b* may activate the selected network energy saving mode 410. The activation may include a transition into the network energy saving mode 410, where a length of the transition may be defined by the network energy saving mode 410. For example, the network energy saving mode 410 may be a deep sleep mode with a longer transition time as described with reference to FIG. 1. While in the network energy saving mode 410, the network entity 105-*b* may reduce its power consumption from the power consumption level 440 to a power consumption level 445, which may indicate power savings at the network entity 105-*b* based on the network entity 105-*b* turning off some functionalities (e.g., particular antennas) during the network energy saving mode 410.

Once having transitioned into the network energy saving mode 410, the network entity 105-*b* may enter a first operating state 415-*a*. The first operating state 415-*a* may include a first time duration 420-*a* as well as a corresponding operating parameter set 430-*a*, where the UE 115-*c* may perform one or more different operations during the operating state 415-*a* according to the operating parameter set 430-*a* as described with reference to FIG. 3. For example, the UE 115-*c* may perform power control operations or data hold operations, or may perform one or more scheduling request configuration operations or data indication operations as described with reference to FIGS. 5-7. After the time duration 420-*a*, the network entity 105-*b* may transition to the next operating state 415-*b*, where the UE 115-*c* may perform one or more operations according to the operating parameter set 430-*b* for the time duration 420-*b*. Similarly, the network entity 105-*b* may transition to any subsequent operating states up until an operating state 415-*c* where the UE 115-*c* may perform operations according to an operating parameter set 430-*c* for a time duration 420-*c*. In some cases, the network entity 105-*b* may also perform one or more operations during each operating state 415. In some examples, the network entity 105-*b* may transition between operating states 415 based on the UE 115-*c* completing the one or more operations for each operating state 415, where the time durations 420 may be based on the UE 115-*c* completing the operations.

After the completion of the last operating state 415-*c*, the network entity 105-*b* may transition to the default operating state 425, where the UE 115-*c* may perform one or more default operations according to the default parameter set 435. In some cases, the UE 115-*c* may perform the one or more default operations for the time duration 420-*d*. In some examples, the message 405 may indicate the time duration 420-*d*. Additionally, or alternatively, the time duration 420-*d* may represent leftover time after the completion of the operations for the operating state 415-*c*. For example, the message 405 may indicate a total duration for the network energy saving mode 410, where the UE 115-*c* may perform operations for each operating state 415 up until the end of the time duration 420-*c*, where the UE 115-*c* may transition to performing default operations until the end of the total duration. In some cases, the one or more default operations and the default parameter set 435 may be preconfigured at the UE 115-*c*, or may be configured by the network entity 105-*b* via an RRC configuration. In some examples, the network entity 105-*b* may transition to an active state after the end of the time duration 420-*d* (e.g., after a total time duration or after the completion of the configured default operating state 425), and may increase its power consumption from the power consumption level 445 to the power consumption level 440, which may indicate turning back on some functionalities (e.g., particular antennas) after the network energy saving mode 410.

In some examples, the first operating state 415-*a* may be a silence window as described herein, where communications between the UE 115-*c* and the network entity 105-*b* may be decreased. For example, based on the operating parameter set 430-*a*, the UE 115-*c* may refrain from transmissions during the first operating state 415-*a*. For example, the UE 115-*c* may refrain from transmitting scheduling requests during the time duration 420-*a*. Accordingly, the network entity 105-*b* may refrain from monitoring for scheduling requests during the time duration 420-*a*. Additionally, or alternatively, UE 115-*c* may transmit one or more scheduling requests based on a scheduling request configuration or based on the presence of high priority data as described in further detail with reference to FIG. 5. By way of another example, the UE 115-*c* may transmit one or more data indications as described in further detail with reference to FIG. 6.

In some examples, the UE 115-*c* may hold data during the silence window. For example, the UE 115-*c* may receive or generate one or more data packets for uplink during the silence window (e.g., operating state 415-*a*) and may refrain from transmitting one or more scheduling requests. In some cases, the UE 115-*c* may accumulate a large amount of data due to low traffic conditions and high throughput based on the UE 115-*c* refraining from transmitting scheduling requests during the operating state 415-*a*. In some examples, the UE 115-*c* may hold the uplink data based on a threshold. For example, the UE 115-*c* may be configured by the network entity 105-*b* (e.g., via RRC), or preconfigured, with a threshold for a maximum amount of data (e.g., bits) that the UE 115-*c* may hold before transmitting a scheduling request. The UE 115-*c* may compare the amount of data held to the threshold, and if the amount of held data exceeds the threshold, the UE 115-*c* may transmit a scheduling request to the network entity 105-*b*. For example, the UE 115-*c* may accumulate 40,000 bits in its uplink data buffer, which may be greater than a threshold of 10,000 bits, and may transmit a scheduling request during the silence window. Alternatively, if the number of bits is less than the threshold, the UE 115-*c* may continue to hold data and may accumulate data until the end of the silence window or until the end of the network energy saving mode 410 based on a configuration. For example, the UE may accumulate 4000 bits in its uplink data buffer, which may be less than the threshold of bits, and may wait to send a scheduling request until the end of the silence window. In some cases, the UE 115-*c* may transmit a scheduling request to the network entity 105-*b* based on a rate of data accumulation. In some examples, the configured threshold may be sleep mode dependent or UE dependent.

When refraining from transmitting scheduling requests, the UE 115-*c* may perform a power control operation during the silence window or during other operating states 415. For example, based on holding data and refraining from transmissions, the UE 115-*c* may enter a sleep mode for the UE 115-*c*, where the sleep mode may include turning off one or more functionalities (e.g., antennas) during the duration of the sleep mode. In some examples, the UE 115-*c* may enter the sleep mode for the UE 115-*c* after completing one or more operations for each operating state 415. For example, the UE 115-*c* may transmit a data indication as described with reference to FIG. 5, and may enter a sleep mode once the data indication has been sent. In some cases, as described herein, the UE 115-*c* may receive state transition indications from the network entity 105-*b* dynamically. In such an example, the UE 115-*c* may enter a sleep mode for the UE 115-*c* after performing one or more operations for each operating state 415.

Figure 5:
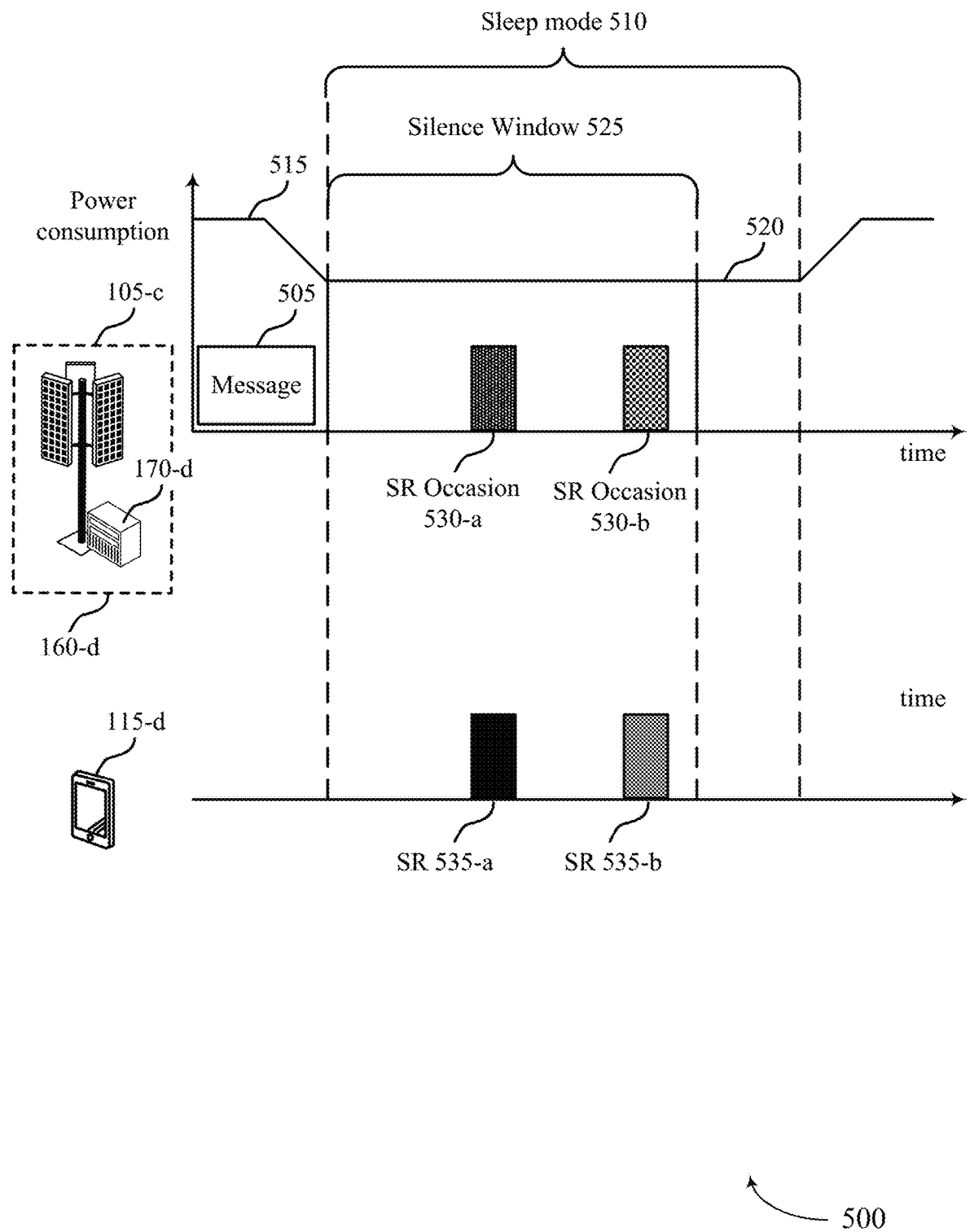
FIG. 5 illustrates an example of a timeline that supports operating states in green network energy saving modes in accordance with one or more aspects of the present disclosure.

FIG. 5 illustrates an example of a timeline 500 that supports operating states in green network energy saving modes in accordance with one or more aspects of the present disclosure. In some examples, the timeline 500 may implement or be implemented by aspects of the wireless communications systems 100 and 300. For example, a UE 115-*d* and a network entity 105-*c* (including a CU 160-*d* and an RU 170-*d*) may communicate in accordance with the timeline 500, where the network entity 105-*c* may indicate a selected network energy saving mode to the UE 115-*d*, and the UE 115-*d* may perform one or more operations based on the indicated network energy saving mode.

In some cases, the timeline 500 may represent an example of the timeline 400 as described with reference to FIG. 4. For example, the network entity 105-*c* may transmit a message 505 indicating a selected sleep mode 510, which may represent a network energy saving mode. The message 505 may also indicate one or more operating states and one or more time durations, and the UE 115-*d* may be configured with one or more operating parameter sets as described herein. After transmitting the message 505, the network entity 105-*c* may reduce its power consumption from a higher power consumption level 515 to a lower power consumption level 520 during the sleep mode 510 by deactivating one or more components and functions. In some examples, the sleep mode 510 may include a silence window 525, where the silence window 525 may represent a first operating state as described with reference to FIG. 4.

In some examples, the UE 115-*d* may be configured according to a scheduling request configuration as described herein. For example, the message 505 may indicate a sparse scheduling request configuration including one or more scheduling request occasions 530, where each scheduling request occasion 530 may represent a time that the network entity 105-*c* may monitor for, and the UE 115-*d* may transmit, a scheduling request 535. For example, the UE 115-*d* may transmit the scheduling request 535-*a* at a scheduling request occasion 530-*a*, may transmit the scheduling request 535-*b* at a scheduling request occasion 530-*b*, or both. In some cases, the scheduling request configuration may include a small number of scheduling requests. In some examples, the network entity 105-*c* may refrain from monitoring for, and the UE 115-*d* may refrain from transmitting, one or more scheduling requests except at the scheduling request occasion 530-*a* and the scheduling request occasion 530-*b*. In some cases, the scheduling request occasion 530-*a* may be toward the middle of the silence window 525 and the scheduling request occasion 530-*b* may be toward the end of the silence window 525.

In some examples, the UE 115-*d* may transmit the scheduling requests 535 based on a presence of high priority data at the UE 115-*d*. For example, the scheduling request configuration may indicate to transmit scheduling requests for high priority data at the scheduling request occasions 530. In some examples, the UE 115-*d* may receive or generate one or more packets of high priority data for transmitting to the network entity 105-*c*, and may determine to transmit the scheduling request 535-*a* at the scheduling request occasion 530-*a* for the high priority data. Based on receiving the scheduling request 535-*a*, the network entity may transition to the active state immediately after receiving the scheduling request 535-*a* to serve the UE 115-*d*. In some cases, the network entity 105-*c* may wait after receiving the scheduling request 535-*a* before transitioning to the active state. In some examples, the UE 115-*d* may not have priority data at the scheduling request occasion 530-*a*, and may refrain from transmitting a scheduling request based on the lack of high priority data. In some cases, the UE 115-*d* may receive or generate high priority data before the scheduling request occasion 530-*b*, and may transmit the scheduling request 535-*b* at the scheduling request occasion 530-*b*, prompting the network entity 105-*c* to transition to the active state to serve the UE 115-*d*. In some examples, the UE 115-*d* may not receive or generate any high priority data during the duration of the silence window 525, in which case the network entity 105-*c* may remain in the sleep mode 510 for a duration of the silence window 525. In some cases, the network entity 105-*c* may serve the UE 115-*d* based on each scheduling request 535-*a* while remaining in the sleep mode 510. For example, the sleep mode may be a micro-sleep or milli-sleep mode and may support serving a few UEs 115 at the small amount of scheduling request occasions.

In some examples, the scheduling requests 535 may include one or more BSRs indicating an amount of high priority data in the uplink buffer of the UE 115-*d*. For example, the UE 115-*d* may perform data hold operations on high priority data during the silence window 525, and may transmit a BSR in the scheduling request 535-*a* indicating an amount of high priority data at the UE 115-*d* at the scheduling request occasion 530-*a*. In some cases, the scheduling request configuration may indicate a data threshold for high priority data at which the UE 115-*d* may transmit a scheduling request 535 during a scheduling request occasion 530. For example, the UE 115-*d* may transmit the scheduling request 535-*a* if the amount of high priority data at the UE 115-*d* is above the threshold, or may refrain from transmitting the scheduling request 535-*a* if the amount of high priority data is less than the threshold. By way of another example, the UE 115-*d* may transmit the scheduling request 535-*a* indicating the BSR if the UE 115-*d* has any high priority data to transmit, and the network entity 105-*c* may determine whether or not to transition to the active state to serve the UE 115-*d* based on comparing the amount of high priority data indicated in the BSR to a threshold.

In some cases, the network entity may transition to one or more additional operating states, or a default operating state, after the silence window 525. In some cases, the UE 115-*d* may perform one or more operations during the operating states, or may perform one or more default operations during the default operating state as described herein. In some examples, the network entity 105-*c* may monitor for scheduling requests for both high priority and low priority data during the one or more operating states or during the default operating state. In some cases, the UE 115-*d* may transmit one or more scheduling requests to the network entity based on receiving or generating one or more data packets associated with high priority or low priority data. In some cases, the network entity may transition to the active state based on receiving a scheduling request for low priority data during the one or more operating states or during the default operating state. Thus, power may be saved at the network entity 105-*c* and the UE 115-*d* during the silence window 525 by supporting a smaller amount of scheduling requests for high priority data.

Figure 6:
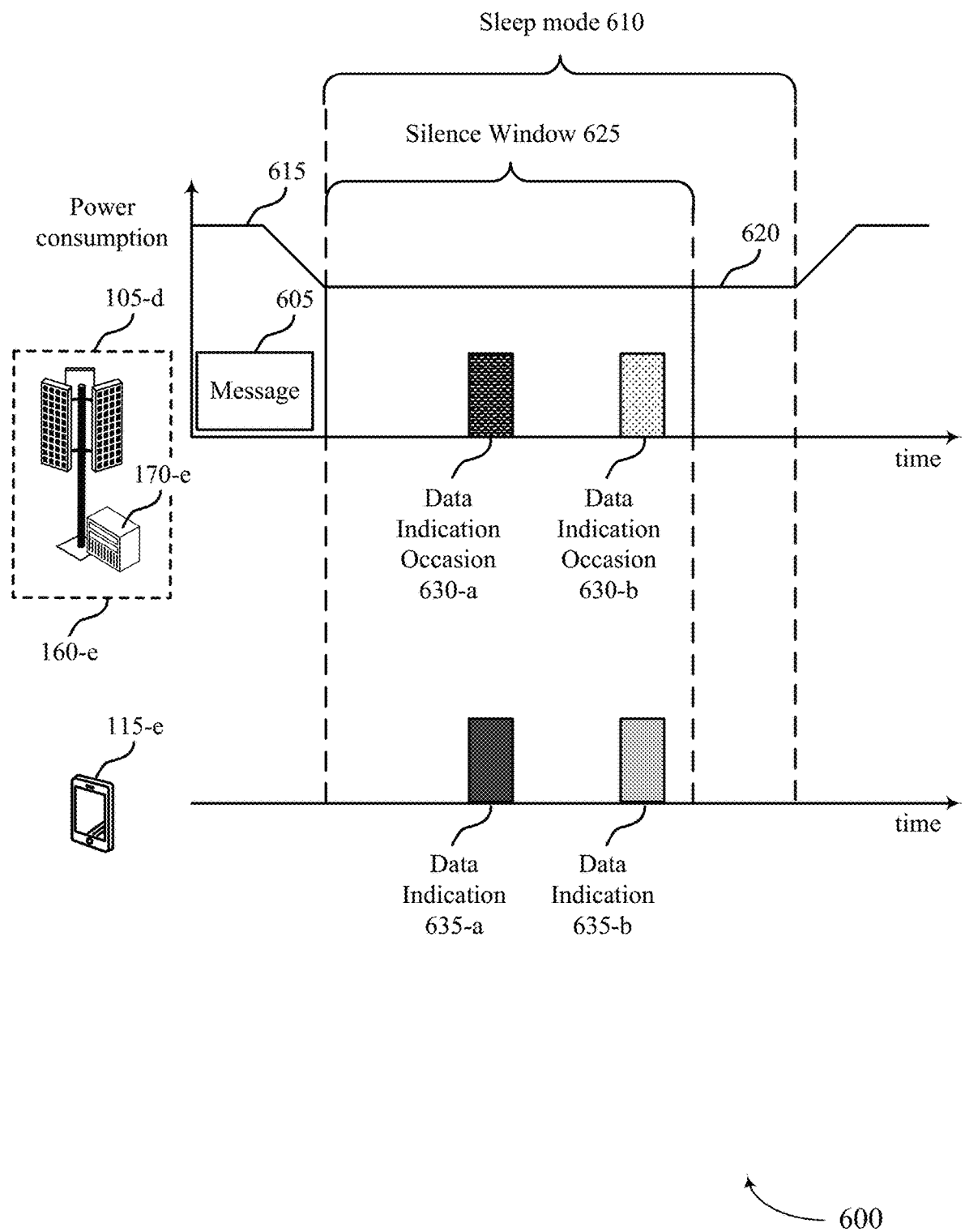
FIG. 6 illustrates an example of a timeline that supports operating states in green network energy saving modes in accordance with one or more aspects of the present disclosure.

FIG. 6 illustrates an example of a timeline 600 that supports operating states in green network energy saving modes in accordance with one or more aspects of the present disclosure. In some examples, the timeline 600 may implement or be implemented by aspects of the wireless communications systems 100 and 300. For example, a UE 115-*e* and a network entity 105-*d* (including a CU 160-*e* and an RU 170-*e*) may communicate in accordance with the timeline 600, where the network entity 105-*d* may indicate a selected network energy saving mode to the UE 115-*e*, and the UE 115-*e* may perform one or more operations based on the indicated network energy saving mode.

In some cases, the timeline 600 may represent an example of the timeline 400 as described with reference to FIG. 4, or the timeline 500 as described with reference to FIG. 5. For example, the network entity 105-*d* may transmit a message 605 indicating a selected sleep mode 610, which may represent a network energy saving mode. The message 605 may also indicate one or more operating states and one or more time durations, and the UE 115-*e* may be configured with one or more operating parameter sets as described herein. After transmitting the message 605, the network entity 105-*d* may reduce its power consumption from a higher power consumption level 615 to a lower power consumption level 620 during the sleep mode 610 by deactivating one or more components and functions. In some examples, the sleep mode 610 may include a silence window 625, where the silence window 625 may represent a first operating state as described with reference to FIG. 4, or a silence window as described with reference to FIG. 5.

In some examples, the UE 115-*e* may be configured according to a data indication configuration as described herein. For example, the message 605 may indicate one or more data indication occasions 630, where each data indication occasion 630 may represent a time that the network entity 105-*d* may monitor for, and the UE 115-*e* may transmit, a data indication 635 indicating data at the UE 115-*e*. For example, the UE 115-*e* may transmit the data indication 635-*a* at a data indication occasion 630-*a*, may transmit the data indication 635-*b* at a data indication occasion 630-*b*, or both. In some examples, the network entity 105-*d* may refrain from monitoring for, and the UE 115-*e* may refrain from transmitting, one or more data indications 635 except at the data indication occasion 630-*a* and the data indication occasion 630-*b*. In some cases, the data indication occasion 630-*a* may be toward the middle of the silence window 625 and data indication occasion 630-*b* may be toward end of the silence window 625. In some cases, the data indications 635 may represent small (e.g., one bit) messages indicating a presence or a lack of presence of data at the UE 115-e. For example, the data indications 635 may represent uplink control information (UCI), one bit sequences (such as a one bit preamble), or an acknowledgment (ACK) or negative acknowledgment (NACK) message.

In some examples, the UE 115-e may transmit the data indications 635 based on a presence of high priority data at the UE 115-e. For example, during the silence window 625, the UE 115-e may refrain from transmitting one or more scheduling requests (e.g., via PUCCH) as described with reference to FIG. 4. The scheduling request configuration may indicate to transmit data indications 635 for high priority data at the data indication occasions 630. The UE 115-d may receive or generate one or more packets of high priority data, and may determine to transmit the data indication 635-a at the data indication occasion 630-a to indicate the presence of high priority data at the UE 115-e (e.g., in the uplink buffer of the UE 115-e). By transmitting small data indications 635 (e.g., UCI or one bit sequences), the UE 115-e may reduce a quantity or complexity of computations at the UE 115-e as well as provide more efficient communications with the network entity 105-d. UCI or one bit data indications may additionally reduce decoding complexity at the network entity 105-d. In some cases, the network entity 105-d may decode the data indications 635 while remaining in the sleep mode 610 (e.g., based on reduced decoding complexity). In some cases, the network entity 105-d may represent or include a small or non-complex hardware able to decode the data indications 635.

In some examples, the network entity 105-d may decide to transition to an active state or remain in the sleep mode 610 based on the receiving data indications 635. For example, the network entity 105-d may receive the data indication 635-a, which may indicate a presence of high priority data in the uplink buffer of the UE 115-e (e.g., may represent a '1'), and may immediately transition to the active state to serve the UE 115-e based on the indication of high priority data. In some examples, the data indication 635-a may indicate a lack of high priority data at the UE 115-e (e.g., may represent a '0'), and the network entity 105-d may remain in the sleep mode 610 based on the indication of the lack of high priority data. The network entity 105-d may similarly transition to an active state or remain in a sleep state based on the data indication 635-b transmitted by the UE 115-e at the data indication occasion 630-b. In some examples, the UE 115-e may refrain from transmitting the data indications 635 based on a lack of high priority data at the UE 115-e, and the network entity 105-d may remain in the sleep mode 610 based on the lack of data indications 635. In some cases, the network entity 105-d may serve the UE 115-e based on each data indication 635 while remaining in the sleep mode 610. For example, the sleep mode may be a micro-sleep or milli-sleep mode and may support serving a few UEs 115 at the data indication occasions 630.

In some cases, the network entity may transition to one or more additional operating states, or a default operating state, after the silence window 625. In some cases, the UE 115-e may perform one or more operations during the operating states, or may perform one or more default operations during the default operating state as described herein. In some examples, the network entity 105-d may monitor for scheduling requests during the one or more operating states or during the default operating state. In some cases, the UE 115-e may transmit one or more scheduling requests to the network entity based on receiving or generating one or more data packets associated with high priority or low priority data. In some cases, the network entity 105-d may transition to the active state based on receiving a scheduling request during the one or more operating states or during the default operating state. Thus, power may be saved at the network entity 105-d and the UE 115-e during the silence window 625 by supporting indication of data at the UE 115-e while in the sleep mode 610.

Figure 7:
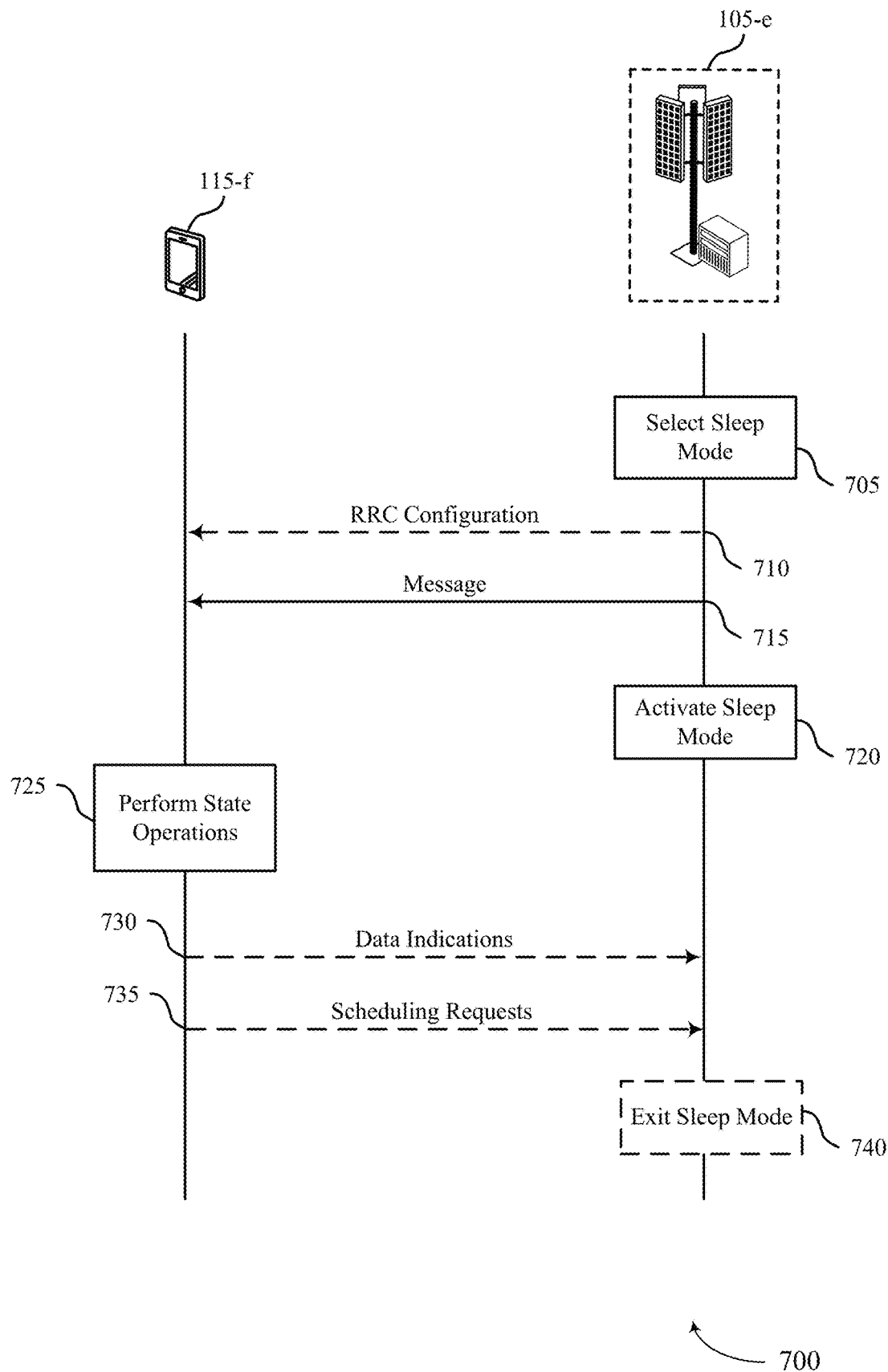
FIG. 7 illustrates an example of a process flow that supports operating states in green network energy saving modes in accordance with one or more aspects of the present disclosure.

FIG. 7 illustrates an example of a process flow 700 that supports operating states in green network energy saving modes in accordance with one or more aspects of the present disclosure. The process flow 700 may implement aspects of the wireless communications systems 100 and 300, or may be implemented by aspects of the wireless communications systems 100 and 300. For example, the process flow 700 may illustrate operations between a UE 115-f and a network entity 105-e, which may be examples of corresponding devices described herein. The process flow 700 may additionally implement aspects of the timelines 400, 500, and 600, or may be implemented by aspects of the timelines 400, 500, and 600. In the following description of the process flow 700, the operations between the UE 115-f and the network entity 105-e may be transmitted in a different order than the example order shown, or the operations performed by the UE 115-f and the network entity 105-e may be performed in different orders or at different times. Some operations may also be omitted from the process flow 700, and other operations may be added to the process flow 700.

At 705 the network entity 105-e may select a network energy saving mode from a set of multiple network energy saving modes for the network entity 105-e based on one or more traffic conditions associated with the network entity 105-e.

At 710 the network entity 105-e may optionally transmit, and the UE 115-f may optionally receive, an RRC signal indicating one or more operating parameters associated with a set of multiple operating states corresponding to the selected network energy saving mode, where the one or more operating parameters may correspond to one or more time durations, and where the one or more time durations may correspond to the set of multiple operating states. In some examples, the one or more operating parameters may comprise an indication of a power control, an indication of a data hold, or both. In some examples, the network entity 105-e may transmit, and the UE 115-f may receive, an RRC signal indicating a buffer threshold corresponding to an amount of data to buffer before a scheduling request transmission. In some examples, the buffer threshold may be specific to the selected network energy saving mode. In some cases, the RRC signal indicating the one or more operating parameters may indicate the buffer threshold.

In some examples, the network entity 105-e may optionally transmit, and the UE 115-f may optionally receive, a control message indicating a length of a silence window for a first operating state of the set of multiple operating states, wherein the control message may include one of a DCI signal or an RRC signal. In some examples, the network entity 105-e may include the length of the silence window in the RRC signal indicating the one or more operating parameters, the RRC signal indicating the buffer threshold, or both. In some examples, the network entity 105-e may include the length of the silence window and the buffer threshold in the RRC signal indicating the one or more operating parameters.

At 715 the network entity 105-e may transmit, and the UE 115-f may receive, a message indicating the network energy saving mode, the set of multiple operating states corresponding to the network energy saving mode, and the one or more time durations corresponding to the set of multiple operating states, where the set of multiple operating states may be associated with the one or more operating parameters corresponding to the one or more time durations. In some examples, the message may indicate the first operating state of the set of multiple operating states, the first operating state indicating a silence window for the first operating state. In some examples, the silence window may be associated with a time duration of the one or more time durations and at least one operating parameter of the one or more operating parameters corresponding to the one or more time durations. In some examples, each operating state of the set of multiple operating states may be specific to the network energy saving mode. By way of another example, each operating state of the set of multiple operating states may be selected from a pool of operating states available for the set of multiple network energy saving modes. In some cases, the message may be transmitted by the network entity 105-e and received by the UE 115-f via a DCI message.

At 720 the network entity 105-e may activate, after transmitting the message, the network energy saving mode for one or more components of the network entity 105-e based on the one or more time durations. In some examples, the at least one operating parameter may indicate a parameter set for scheduling request transmissions within the silence window. In some cases, the network entity 105-e may refrain from monitoring for one or more scheduling request transmissions for the time duration based on the parameter set for scheduling request transmissions. In some examples, the at least one operating parameter may indicate deactivation of a periodic or aperiodic parameter set for scheduling request transmissions within the silence window.

In some examples, the parameter set may indicate one or more scheduling request occasions for scheduling request transmissions, where the network entity 105-e may monitor for one or more scheduling request transmissions during the one or more scheduling request occasions based on the parameter set for scheduling request transmissions. In some cases, the one or more scheduling request occasions may include a first scheduling request occasion at a first time during the time duration and a second scheduling request occasion at a second time during the time duration subsequent to the first time. In some examples, the at least one operating parameter may indicate that the one or more scheduling request occasions are for data having a priority above a threshold priority.

In some examples, the at least one operating parameter may indicate a parameter set for data indication transmissions within the silence window. In some examples, the parameter set for data indication transmissions may indicate one or more data indication occasions for data indication transmissions. In some cases, the network entity 105-e may monitor for one or more data indication transmissions during the one or more data indication occasions based on the parameter set for data indication transmissions.

At 725, the UE 115-f may perform, for the one or more time durations, one or more operations in accordance with the one or more operating parameters based on receiving the message. In some examples, performing the one or more operations in accordance with the one or more operating parameters for the one or more time durations may include activating a first timer for a first time duration corresponding to a first operating state of the set of multiple operating states, performing one or more operations in accordance with one or more operating parameters corresponding to the first time duration, activating a second timer for a second time duration for a second operating state after the first timer has expired, and performing one or more operations in accordance with one or more operating parameters corresponding to the second time duration. In some cases, the UE 115-f may perform one or more default operations after the one or more time durations.

At 730, the UE 115-f may transmit, and the network entity 105-e may receive, one or more scheduling requests during the one or more scheduling request occasions based on the parameter set for scheduling request transmissions. In some cases, the UE 115-f may transmit a scheduling request based on an amount of data at the UE 115-f being greater than the buffer threshold. In some examples, the UE 115-f may refrain from transmitting one or more scheduling requests for the time duration of the silence window based on the parameter set for scheduling request transmissions.

At 735, the UE 115-f may transmit, and the network entity 105-e may receive, one or more data indications during the one or more data indication occasions based on the parameter set for data indication transmissions. In some examples, transmitting the one or more data indications may include the UE 115-f transmitting a second message comprising a data indication, where the data indication may indicate a presence of data at the UE 115-f In some cases, the network entity 105-e may receive the second message. In some cases, the data indication may include a sequence specific to the data indication. In some examples, the data at the UE may be associated with a priority above a threshold priority.

At 740, the network entity 105-e may activate an active mode based on receiving the second message comprising the data indication.

Figure 8:
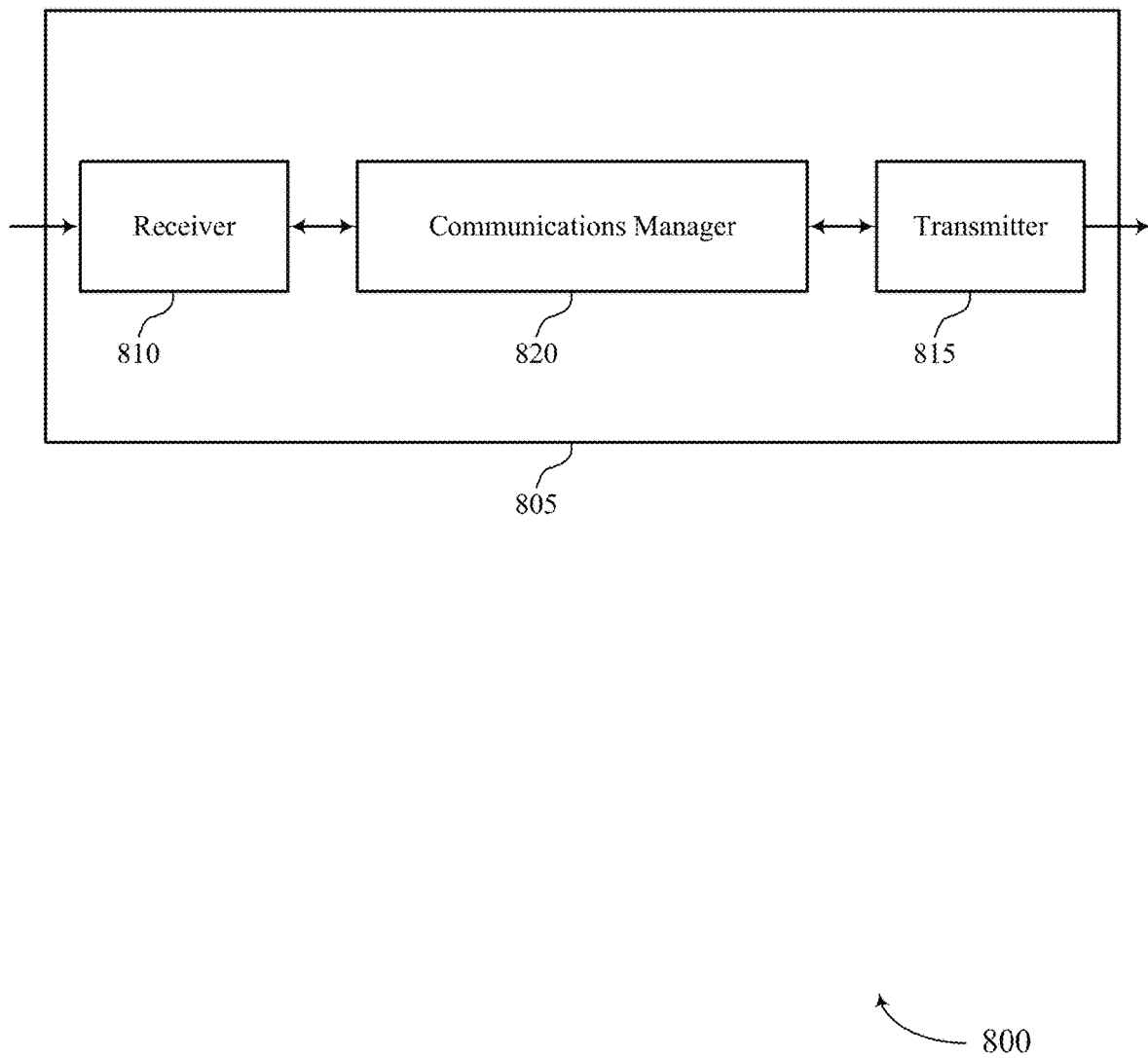
FIGS. 8 and 9 show block diagrams of devices that support operating states in green network energy saving modes in accordance with one or more aspects of the present disclosure.

FIG. 8 shows a block diagram 800 of a device 805 that supports operating states in green network energy saving modes in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of operating states in green network energy saving modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for selecting a network energy saving mode from a set of multiple network energy saving modes for the network entity based on one or more traffic conditions associated with the network entity. The communications manager 820 may be configured as or otherwise support a means for transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations. The communications manager 820 may be configured as or otherwise support a means for activating, after transmitting the message, the network energy saving mode for one or more components of the network entity based on the one or more time durations.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for a network entity supporting operating states for network energy saving modes, which may reduce power consumption and increase resource efficiency as a network entity may remain in a sleep mode longer based on decreased communications. For example, the network entity may turn off particular components or functionalities (e.g., antennas), which may reduce the transmissions the network entity performs with a wireless device (e.g., a UE), thereby saving power at the network entity. The techniques may also support reduced complexity in computation and reduced processing at the network entity.

Figure 9:
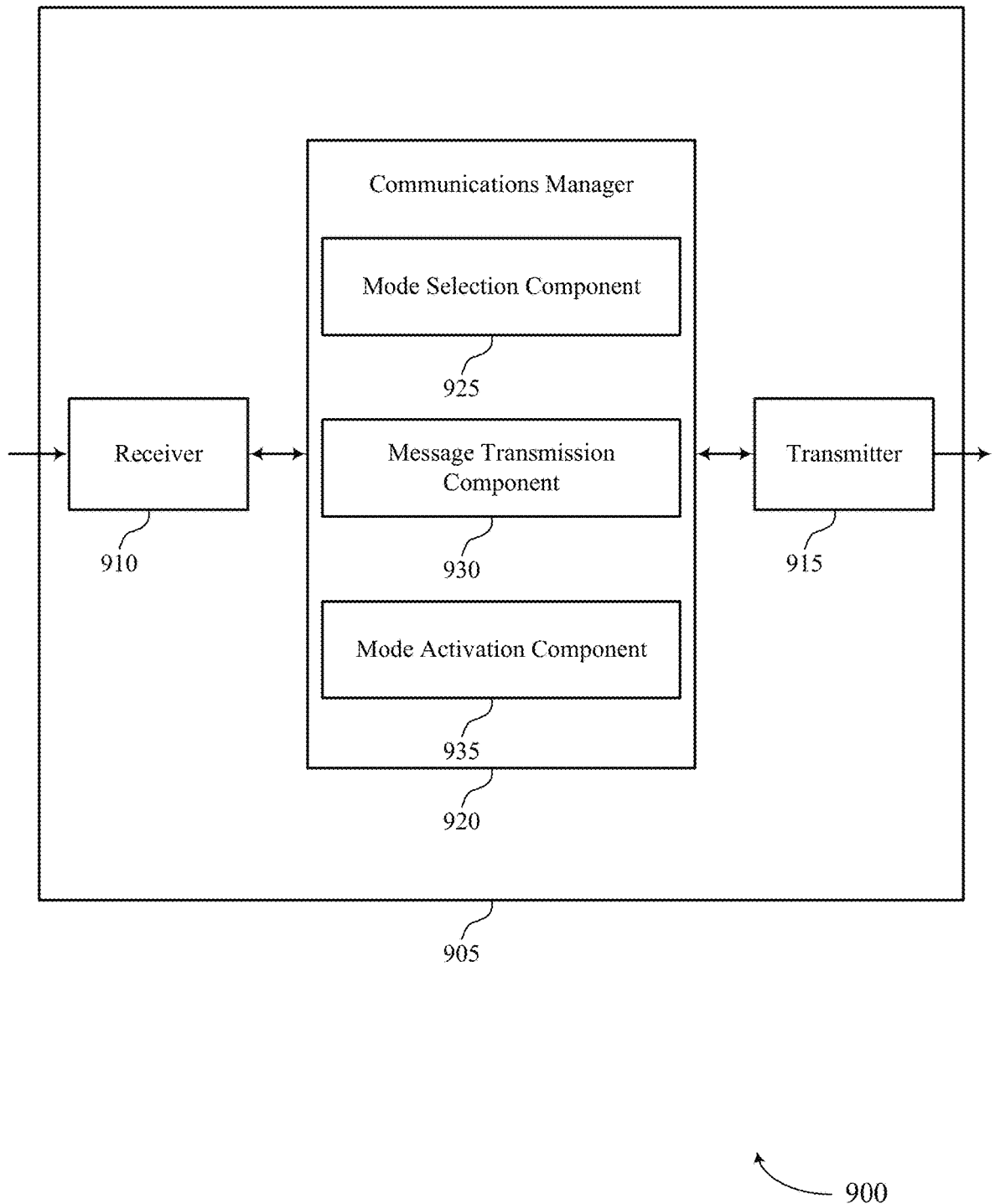

FIG. 9 shows a block diagram 900 of a device 905 that supports operating states in green network energy saving modes in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of operating states in green network energy saving modes as described herein. For example, the communications manager 920 may include a mode selection component 925, a message transmission component 930, a mode activation component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The mode selection component 925 may be configured as or otherwise support a means for selecting a network energy saving mode from a set of multiple network energy saving modes for the network entity based on one or more traffic conditions associated with the network entity. The message transmission component 930 may be configured as or otherwise support a means for transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations. The mode activation component 935 may be configured as or otherwise support a means for activating, after transmitting the message, the network energy saving mode for one or more components of the network entity based on the one or more time durations.

Figure 10:
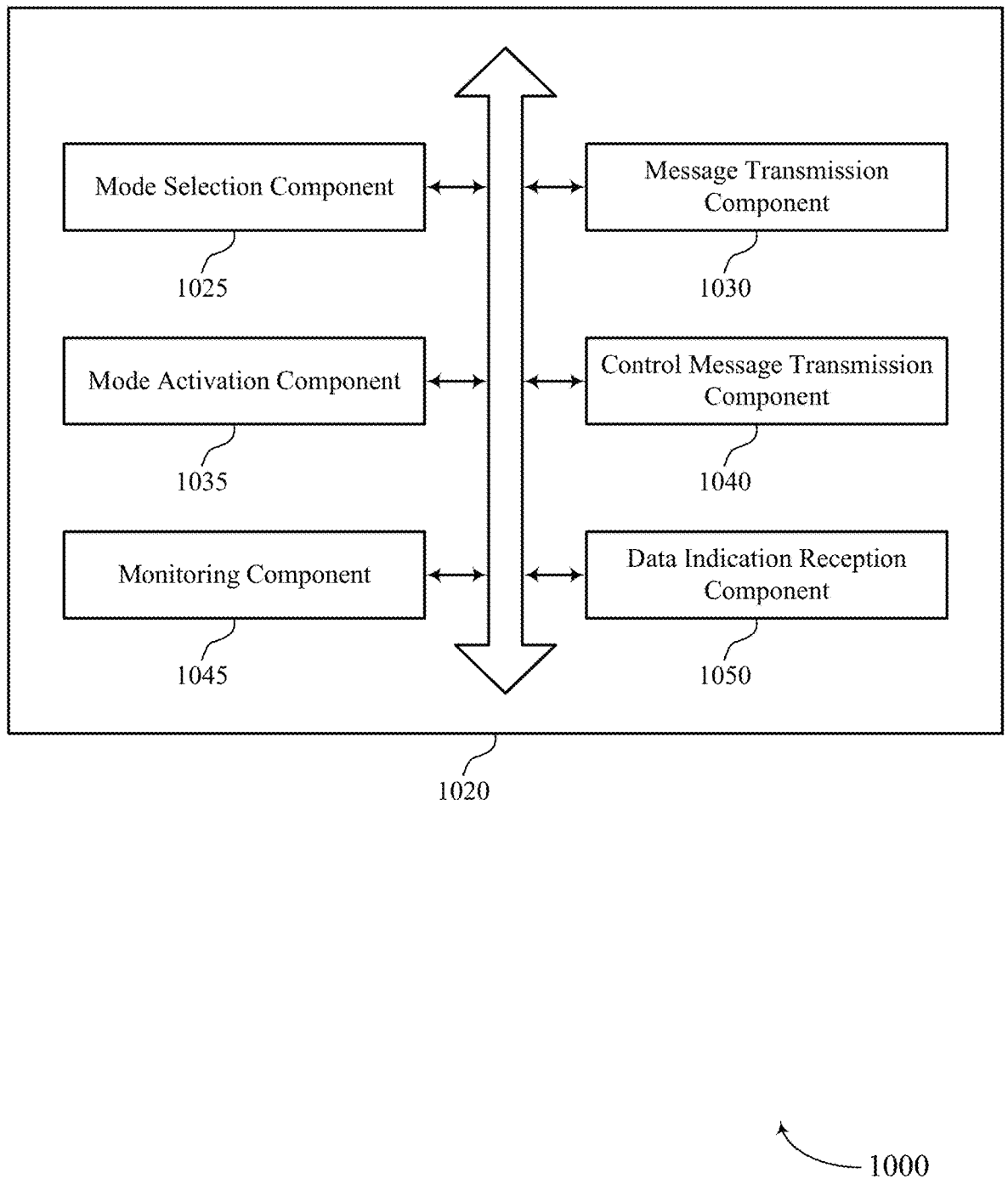
FIG. 10 shows a block diagram of a communications manager that supports operating states in green network energy saving modes in accordance with one or more aspects of the present disclosure.

FIG. 10 shows a block diagram 1000 of a communications manager 1020 that supports operating states in green network energy saving modes in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of operating states in green network energy saving modes as described herein. For example, the communications manager 1020 may include a mode selection component 1025, a message transmission component 1030, a mode activation component 1035, a control message transmission component 1040, a monitoring component 1045, a data indication reception component 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The mode selection component 1025 may be configured as or otherwise support a means for selecting a network energy saving mode from a set of multiple network energy saving modes for the network entity based on one or more traffic conditions associated with the network entity. The message transmission component 1030 may be configured as or otherwise support a means for transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations. The mode activation component 1035 may be configured as or otherwise support a means for activating, after transmitting the message, the network energy saving mode for one or more components of the network entity based on the one or more time durations.

In some examples, to support transmitting the message, the message transmission component 1030 may be configured as or otherwise support a means for transmitting the message indicating a first operating state of the set of multiple operating states, the first operating state indicating a silence window for the first operating state, where the silence window is associated with a time duration of the one or more time durations and at least one operating parameter of the one or more operating parameters corresponding to the one or more time durations.

In some examples, the at least one operating parameter indicates a parameter set for scheduling request transmissions within the silence window, and the monitoring component 1045 may be configured as or otherwise support a means for refraining from monitoring for one or more scheduling request transmissions for the time duration based on the parameter set for scheduling request transmissions.

In some examples, the at least one operating parameter indicates a parameter set for scheduling request transmissions within the silence window, where the parameter set indicates one or more scheduling request occasions for scheduling request transmissions, and the monitoring component 1045 may be configured as or otherwise support a means for monitoring for one or more scheduling request transmissions during the one or more scheduling request occasions based on the parameter set for scheduling request transmissions. In some examples, the at least one operating parameter indicates that the one or more scheduling request occasions are for data having a priority above a threshold priority.

In some examples, the one or more scheduling request occasions may include a first scheduling request occasion at a first time during the time duration. In some examples, the one or more scheduling request occasions may include a second scheduling request occasion at a second time during the time duration subsequent to the first time.

In some examples, the at least one operating parameter indicates a parameter set for data indication transmissions within the silence window, where the parameter set indicates one or more data indication occasions for data indication transmissions, and the monitoring component 1045 may be configured as or otherwise support a means for monitoring for one or more data indication transmissions during the one or more data indication occasions based on the parameter set for data indication transmissions.

In some examples, the data indication reception component 1050 may be configured as or otherwise support a means for receiving a second message including a data indication, where the data indication indicates a presence of data at a UE. In some examples, the mode activation component 1035 may be configured as or otherwise support a means for activating an active mode based on receiving the second message including the data indication. In some examples, the data indication includes a sequence specific to the data indication. In some examples, the data at the UE is associated with a priority above a threshold priority. In some examples, the at least one operating parameter indicates deactivation of a periodic or aperiodic parameter set for scheduling request transmissions within the silence window.

In some examples, to support transmitting the message, the message transmission component 1030 may be configured as or otherwise support a means for transmitting the message indicating the set of multiple operating states, where each operating state of the set of multiple operating states is specific to the network energy saving mode. In some examples, to support transmitting the message, the message transmission component 1030 may be configured as or otherwise support a means for transmitting the message indicating the set of multiple operating states, where each operating state of the set of multiple operating states is selected from a pool of operating states available for the set of multiple network energy saving modes. In some examples, to support transmitting the message, the message transmission component 1030 may be configured as or otherwise support a means for transmitting the message via a DCI message.

In some examples, the control message transmission component 1040 may be configured as or otherwise support a means for transmitting an RRC signal indicating the one or more operating parameters associated with the set of multiple operating states. In some examples, to support transmitting the RRC signal, the control message transmission component 1040 may be configured as or otherwise support a means for transmitting the RRC signal indicating the one or more operating parameters, where the one or more operating parameters include an indication of a power control, an indication of a data hold, or both.

In some examples, the control message transmission component 1040 may be configured as or otherwise support a means for transmitting an RRC signal indicating a buffer threshold corresponding to an amount of data to buffer before a scheduling request transmission. In some examples, the buffer threshold is specific to the network energy saving mode. In some examples, the control message transmission component 1040 may be configured as or otherwise support a means for transmitting a control message indicating a length of a silence window for a first operating state of the set of multiple operating states, where the control message includes one of a DCI signal or an RRC signal.

Figure 11:
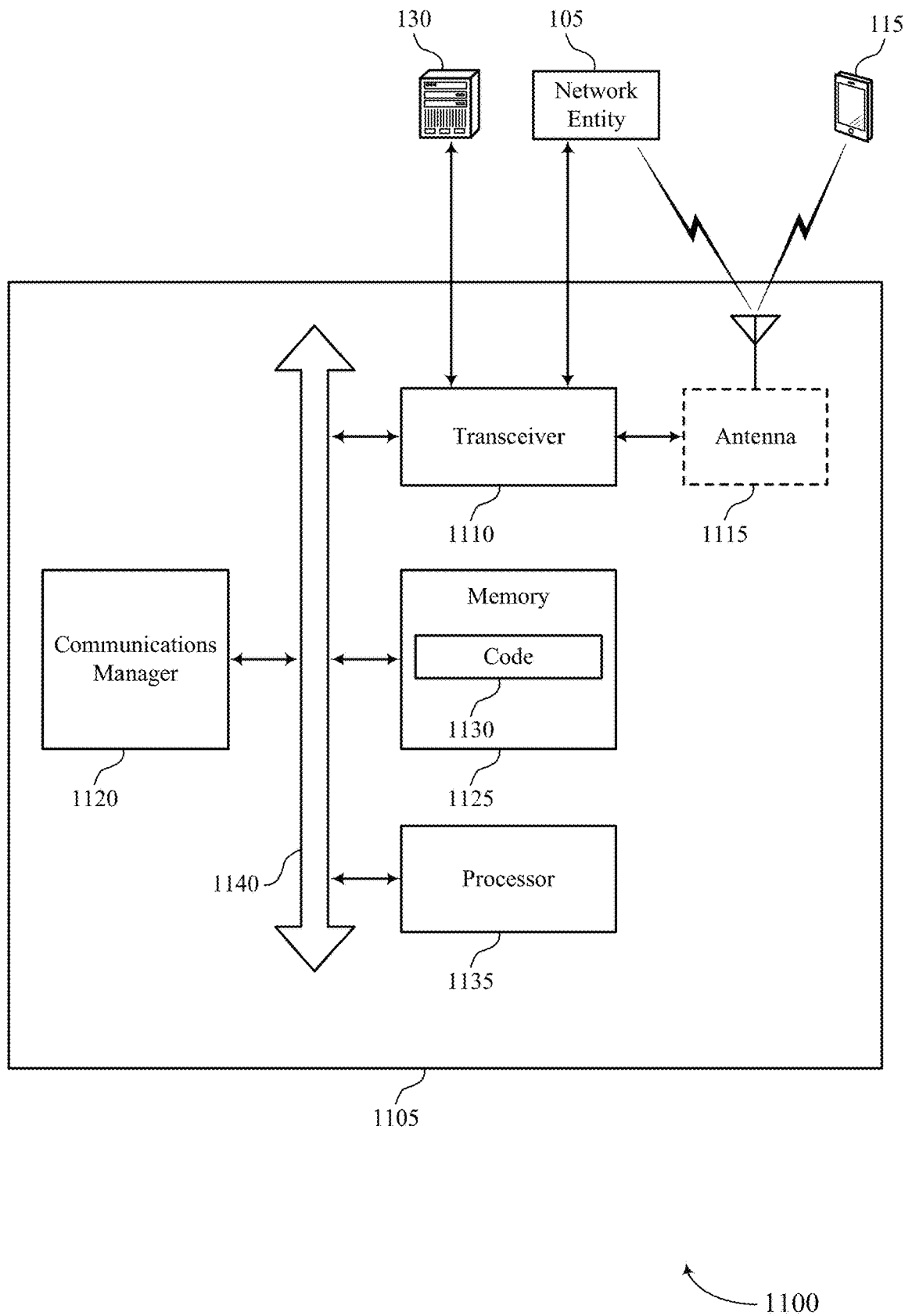
FIG. 11 shows a diagram of a system including a device that supports operating states in green network energy saving modes in accordance with one or more aspects of the present disclosure.

FIG. 11 shows a diagram of a system 1100 including a device 1105 that supports operating states in green network energy saving modes in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include random access memory (RAM) and read-only memory (ROM). The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a basic I/O system (BIOS) which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting operating states in green network energy saving modes). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for selecting a network energy saving mode from a set of multiple network energy saving modes for the network entity based on one or more traffic conditions associated with the network entity. The communications manager 1120 may be configured as or otherwise support a means for transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations. The communications manager 1120 may be configured as or otherwise support a means for activating, after transmitting the message, the network energy saving mode for one or more components of the network entity based on the one or more time durations.

By including or configuring the communications manager 1120 in accordance with examples as described herein, the device 1105 may support techniques for a network entity supporting operating states in green network energy saving modes, which may support reduced power and resource efficiency as a network entity may remain in a sleep mode longer based on decreased communications. For example, the network entity may turn off particular components or functionalities (e.g., antennas), which may reduce the transmissions the network entity performs with the UE, thereby saving power at the network entity. The techniques may also support reduced complexity in computation and reduced processing at the network entity.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of operating states in green network energy saving modes as described herein, or the processor 1135 and the memory 1125 may be otherwise configured to perform or support such operations.

Figure 12:
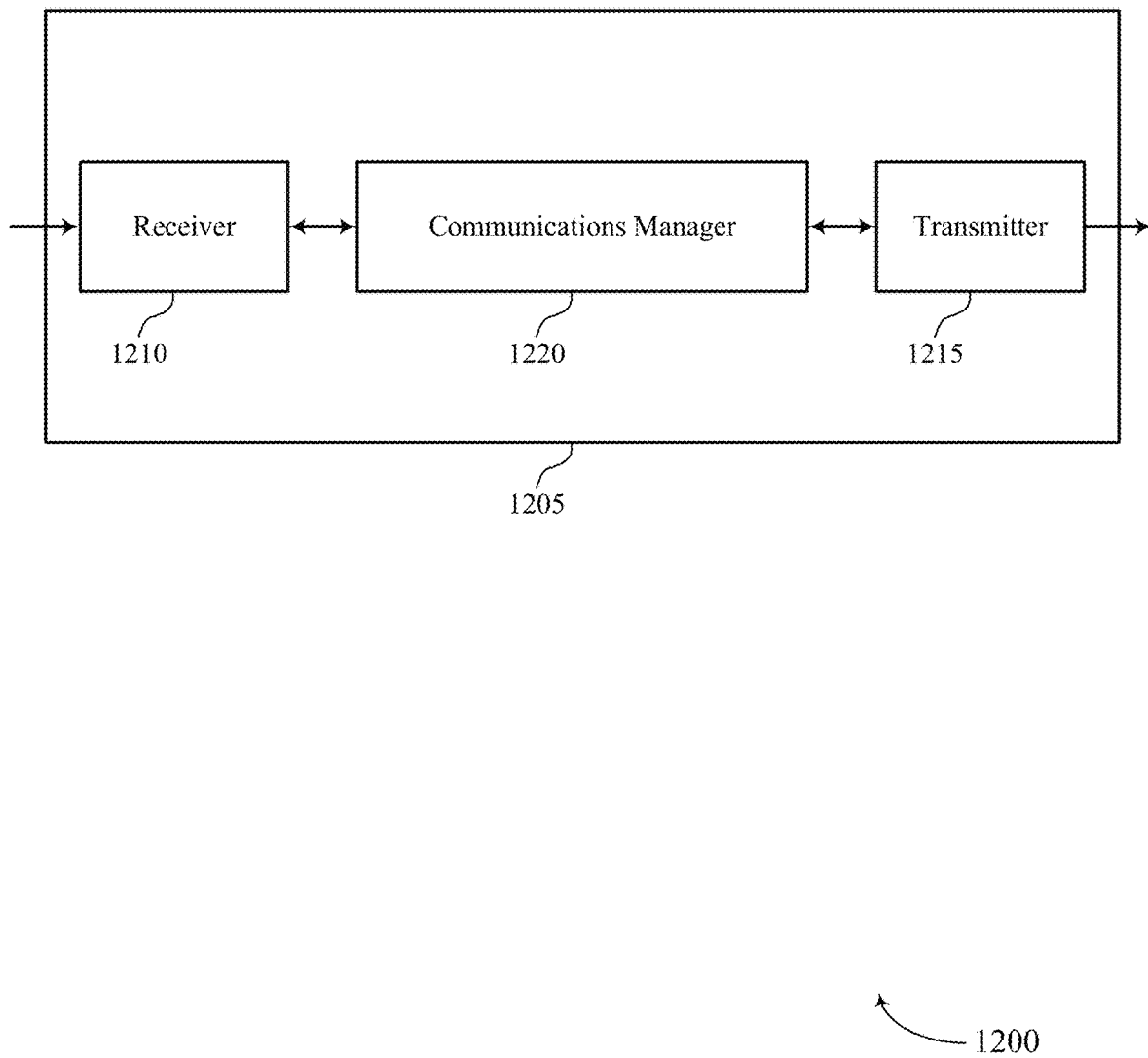
FIGS. 12 and 13 show block diagrams of devices that support operating states in green network energy saving modes in accordance with one or more aspects of the present disclosure.

FIG. 12 shows a block diagram 1200 of a device 1205 that supports operating states in green network energy saving modes in accordance with one or more aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to operating states in green network energy saving modes). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to operating states in green network energy saving modes). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of operating states in green network energy saving modes as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a UE in accordance with examples as disclosed herein. For example, the communications manager 1220 may be configured as or otherwise support a means for receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The communications manager 1220 may be configured as or otherwise support a means for performing, for the one or more time durations, one or more operations in accordance with the one or more operating parameters based on receiving the message.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for a UE supporting operating states in green network energy saving modes, which may support reduced power and resource efficiency as a UE may decrease communications with a network entity during one or more network energy saving modes. For example, based on refraining from transmissions during a network energy saving mode, the UE may enter a sleep mode and may turn off particular components or functionalities (e.g., antennas), which may reduce the transmissions the UE performs with the network entity, thereby saving power at the UE. The techniques may also support reduced complexity in computation and reduced processing at the UE.

Figure 13:
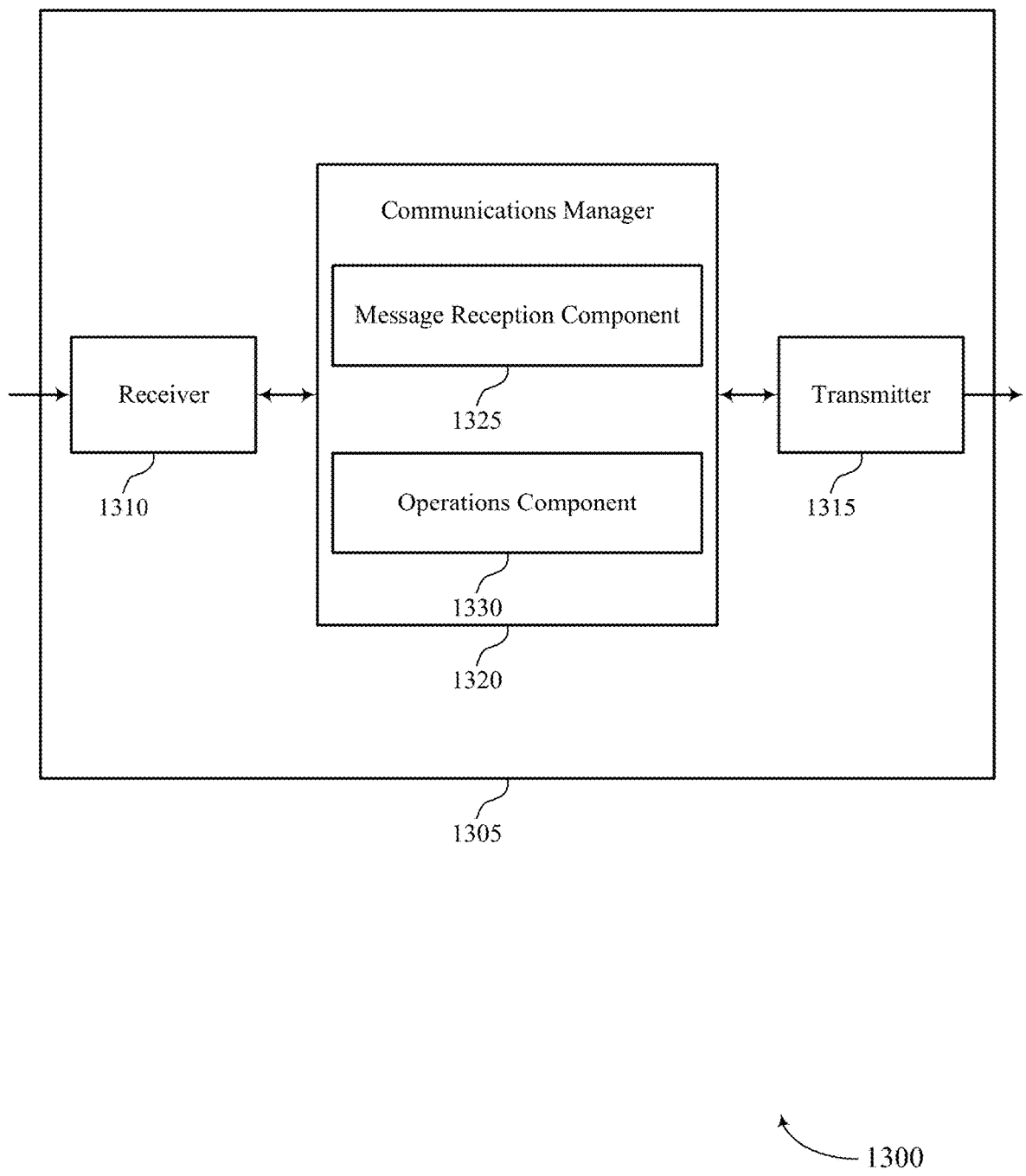

FIG. 13 shows a block diagram 1300 of a device 1305 that supports operating states in green network energy saving modes in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to operating states in green network energy saving modes). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to operating states in green network energy saving modes). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of operating states in green network energy saving modes as described herein. For example, the communications manager 1320 may include a message reception component 1325 an operations component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a UE in accordance with examples as disclosed herein. The message reception component 1325 may be configured as or otherwise support a means for receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The operations component 1330 may be configured as or otherwise support a means for performing, for the one or more time durations, one or more operations in accordance with the one or more operating parameters based on receiving the message.

Figure 14:
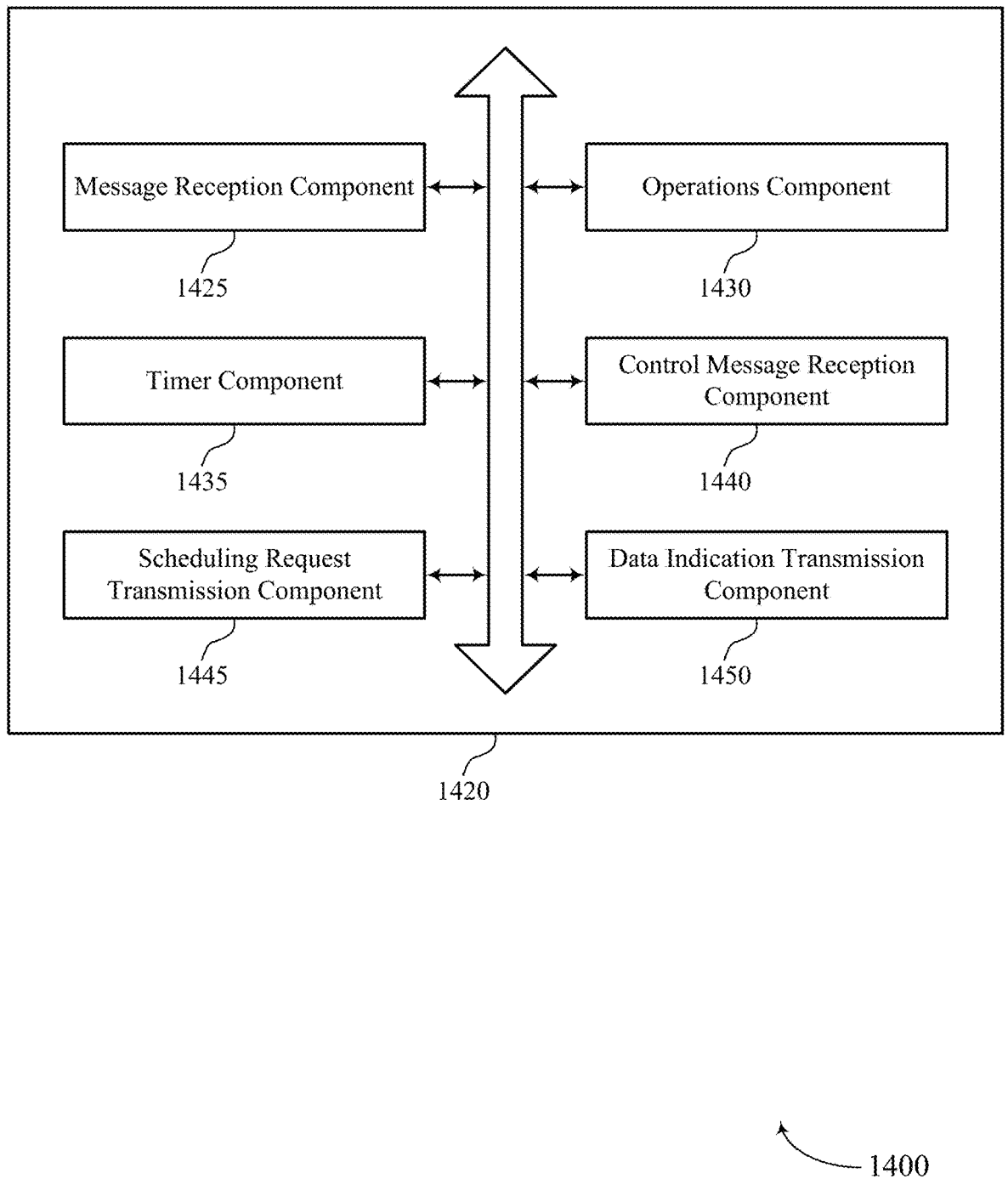
FIG. 14 shows a block diagram of a communications manager that supports operating states in green network energy saving modes in accordance with one or more aspects of the present disclosure.

FIG. 14 shows a block diagram 1400 of a communications manager 1420 that supports operating states in green network energy saving modes in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of operating states in green network energy saving modes as described herein. For example, the communications manager 1420 may include a message reception component 1425, an operations component 1430, a timer component 1435, a control message reception component 1440, a scheduling request transmission component 1445, a data indication transmission component 1450, or any combination thereof. Each of these components may communicate, directly or indirectly, with one another (e.g., via one or more buses).

The communications manager 1420 may support wireless communication at a UE in accordance with examples as disclosed herein. The message reception component 1425 may be configured as or otherwise support a means for receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The operations component 1430 may be configured as or otherwise support a means for performing, for the one or more time durations, one or more operations in accordance with the one or more operating parameters based on receiving the message.

In some examples, to support performing the one or more operations in accordance with the one or more operating parameters for the one or more time durations, the timer component 1435 may be configured as or otherwise support a means for activating a first timer for a first time duration corresponding to a first operating state of the set of multiple operating states. In some examples, to support performing the one or more operations in accordance with the one or more operating parameters for the one or more time durations, the operations component 1430 may be configured as or otherwise support a means for performing one or more operations in accordance with one or more operating parameters corresponding to the first time duration. In some examples, to support performing the one or more operations in accordance with the one or more operating parameters for the one or more time durations, the timer component 1435 may be configured as or otherwise support a means for activating a second timer for a second time duration for a second operating state after the first timer has expired. In some examples, to support performing the one or more operations in accordance with the one or more operating parameters for the one or more time durations, the operations component 1430 may be configured as or otherwise support a means for performing one or more operations in accordance with one or more operating parameters corresponding to the second time duration.

In some examples, the operations component 1430 may be configured as or otherwise support a means for performing one or more default operations after the one or more time durations. In some examples, to support receiving the message, the message reception component 1425 may be configured as or otherwise support a means for receiving the message indicating a first operating state of the set of multiple operating states, the first operating state indicating a silence window for the first operating state, where the silence window is associated with a time duration of the one or more time durations and at least one operating parameter of the one or more operating parameters corresponding to the one or more time durations.

In some examples, the at least one operating parameter indicates a parameter set for scheduling request transmissions within the silence window, and the scheduling request transmission component 1445 may be configured as or otherwise support a means for refraining from transmitting one or more scheduling requests for the time duration based on the parameter set for scheduling request transmissions.

In some examples, the at least one operating parameter indicates a parameter set for scheduling request transmissions within the silence window, where the parameter set indicates one or more scheduling request occasions for scheduling request transmissions, and the scheduling request transmission component 1445 may be configured as or otherwise support a means for transmitting one or more scheduling requests during the one or more scheduling request occasions based on the parameter set for scheduling request transmissions. In some examples, the at least one operating parameter indicates that the one or more scheduling request occasions are for data having a priority above a threshold priority.

In some examples, the one or more scheduling request occasions may include a first scheduling request occasion at a first time during the time duration. In some examples, the one or more scheduling request occasions may include a second scheduling request occasion at a second time during the time duration subsequent to the first time.

In some examples, the at least one operating parameter indicates a parameter set for data indication transmissions within the silence window, where the parameter set indicates one or more data indication occasions for data indication transmissions, and the data indication transmission component 1450 may be configured as or otherwise support a means for transmitting one or more data indications during the one or more data indication occasions based on the parameter set for data indication transmissions.

In some examples, to support transmitting the one or more data indications, the data indication transmission component 1450 may be configured as or otherwise support a means for transmitting a second message including a data indication, where the data indication indicates a presence of data at a UE. In some examples, the data indication includes a sequence specific to the data indication. In some examples, the data at the UE is associated with a priority above a threshold priority. In some examples, the at least one operating parameter indicates deactivation of a periodic or aperiodic parameter set for scheduling request transmissions within the silence window.

In some examples, to support receiving the message, the message reception component 1425 may be configured as or otherwise support a means for receiving the message indicating the set of multiple operating states, where each operating state of the set of multiple operating states is specific to the network energy saving mode. In some examples, to support receiving the message, the message reception component 1425 may be configured as or otherwise support a means for receiving the message indicating the set of multiple operating states, where each operating state of the set of multiple operating states is selected from a pool of operating states available for a set of multiple network energy saving modes including the network energy saving mode. In some examples, to support receiving the message, the message reception component 1425 may be configured as or otherwise support a means for receiving the message via a DCI message.

In some examples, the control message reception component 1440 may be configured as or otherwise support a means for receiving an RRC signal indicating the one or more operating parameters associated with the set of multiple operating states. In some examples, to support receiving the RRC signal, the control message reception component 1440 may be configured as or otherwise support a means for receiving the RRC signal indicating the one or more operating parameters, where the one or more operating parameters include an indication of a power control, an indication of a data hold, or both.

In some examples, the control message reception component 1440 may be configured as or otherwise support a means for receiving an RRC signal indicating a buffer threshold corresponding to an amount of data to buffer before a scheduling request transmission. In some examples, the scheduling request transmission component 1445 may be configured as or otherwise support a means for transmitting a scheduling request based on an amount of data at a UE being greater than the buffer threshold. In some examples, the buffer threshold is specific to the network energy saving mode. In some examples, the control message reception component 1440 may be configured as or otherwise support a means for receiving a control message indicating a length of a silence window for a first operating state of the set of multiple operating states, where the control message includes one of a DCI signal or an RRC signal.

Figure 15:
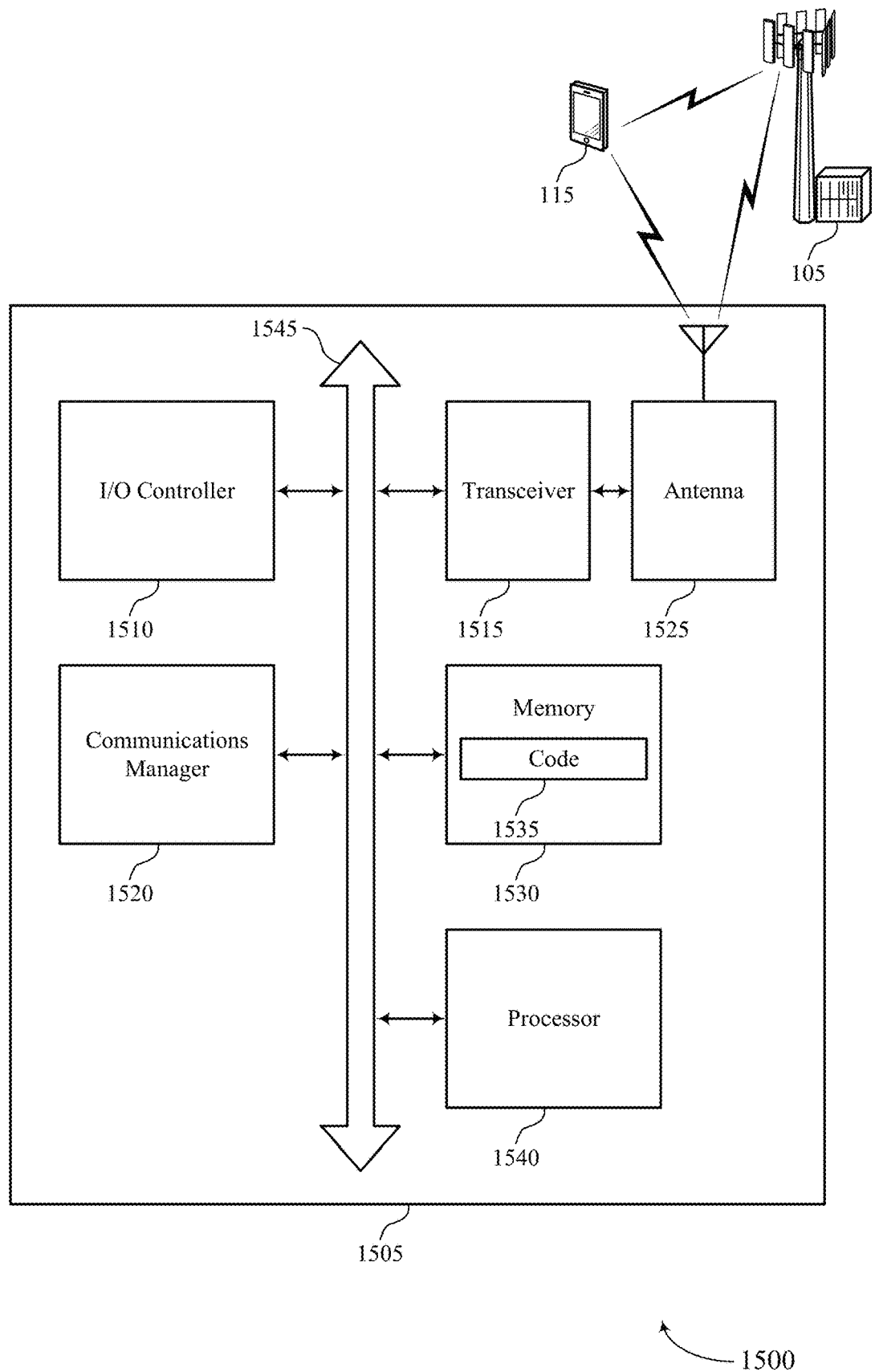
FIG. 15 shows a diagram of a system including a device that supports operating states in green network energy saving modes in accordance with one or more aspects of the present disclosure.

FIG. 15 shows a diagram of a system 1500 including a device 1505 that supports operating states in green network energy saving modes in accordance with one or more aspects of the present disclosure. The device 1505 may be an example of or include the components of a device 1205, a device 1305, or a UE 115 as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting operating states in green network energy saving modes). For example, the device 1505 or a component of the device 1505 may include a processor 1540 and memory 1530 coupled with or to the processor 1540, the processor 1540 and memory 1530 configured to perform various functions described herein.

The communications manager 1520 may support wireless communication at a UE in accordance with examples as disclosed herein. For example, the communications manager 1520 may be configured as or otherwise support a means for receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The communications manager 1520 may be configured as or otherwise support a means for performing, for the one or more time durations, one or more operations in accordance with the one or more operating parameters based on receiving the message.

By including or configuring the communications manager 1520 in accordance with examples as described herein, the device 1505 may support techniques for a UE supporting operating states in green network energy saving modes, which may support reduced power and resource efficiency as a UE may decrease communications with a network entity during one or more network energy saving modes. For example, based on refraining from transmissions during a network energy saving mode, the UE may enter a sleep mode and may turn off particular components or functionalities (e.g., antennas), which may reduce the transmissions the UE performs with the network entity, thereby saving power at the UE. The techniques may also support reduced complexity in computation and reduced processing at the UE.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of operating states in green network energy saving modes as described herein, or the processor 1540 and the memory 1530 may be otherwise configured to perform or support such operations.

Figure 16:
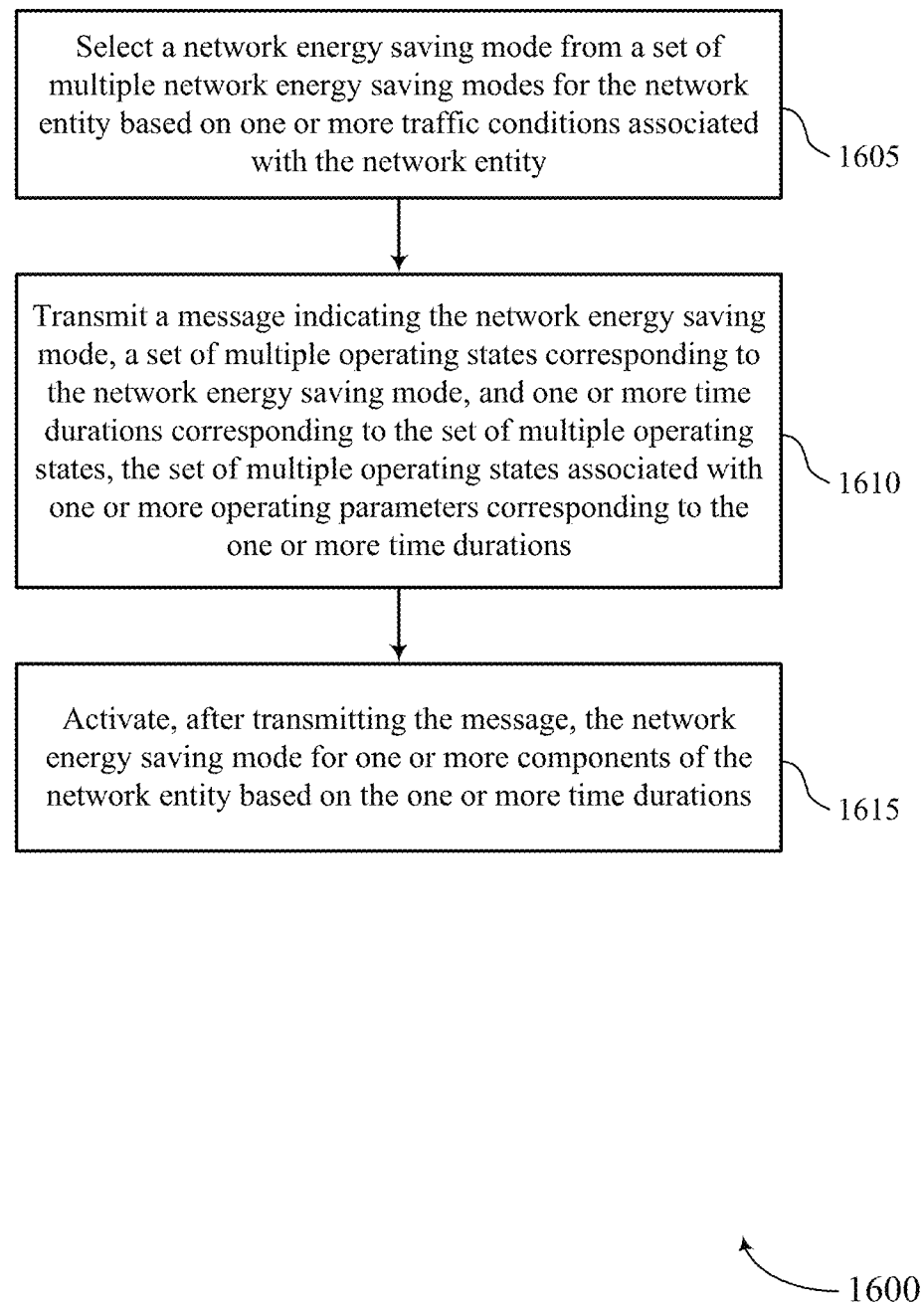
FIGS. 16 through 19 show flowcharts illustrating methods that support operating states in green network energy saving modes in accordance with one or more aspects of the present disclosure.

FIG. 16 shows a flowchart illustrating a method 1600 that supports operating states in green network energy saving modes in accordance with one or more aspects of the present disclosure. The operations of the method 1600 may be implemented by a network entity or its components as described herein. For example, the operations of the method 1600 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1605, the method may include selecting a network energy saving mode from a set of multiple network energy saving modes for the network entity based on one or more traffic conditions associated with the network entity. The operations of 1605 may be performed in accordance with examples as disclosed herein. In some examples, aspects of the operations of 1605 may be performed by a mode selection component 1025 as described with reference to FIG. 10.

At 1610, the method may include transmitting a message indicating the network energy saving mode, a set of multiple operating states corresponding to the network energy saving mode, and one or more time durations corresponding to the set of multiple operating states, the set of multiple operating states associated with one or more operating parameters corresponding to the one or more time durations. The operations of 1610 may be performed in accordance with examples as disclosed herein. In some examples, aspects of the operations of 1610 may be performed by a message transmission component 1030 as described with reference to FIG. 10.

At 1615, the method may include activating, after transmitting the message, the network energy saving mode for one or more components of the network entity based on the one or more time durations. The operations of 1615 may be performed in accordance with examples as disclosed herein. In some examples, aspects of the operations of 1615 may be performed by a mode activation component 1035 as described with reference to FIG. 10.

Figure 17:
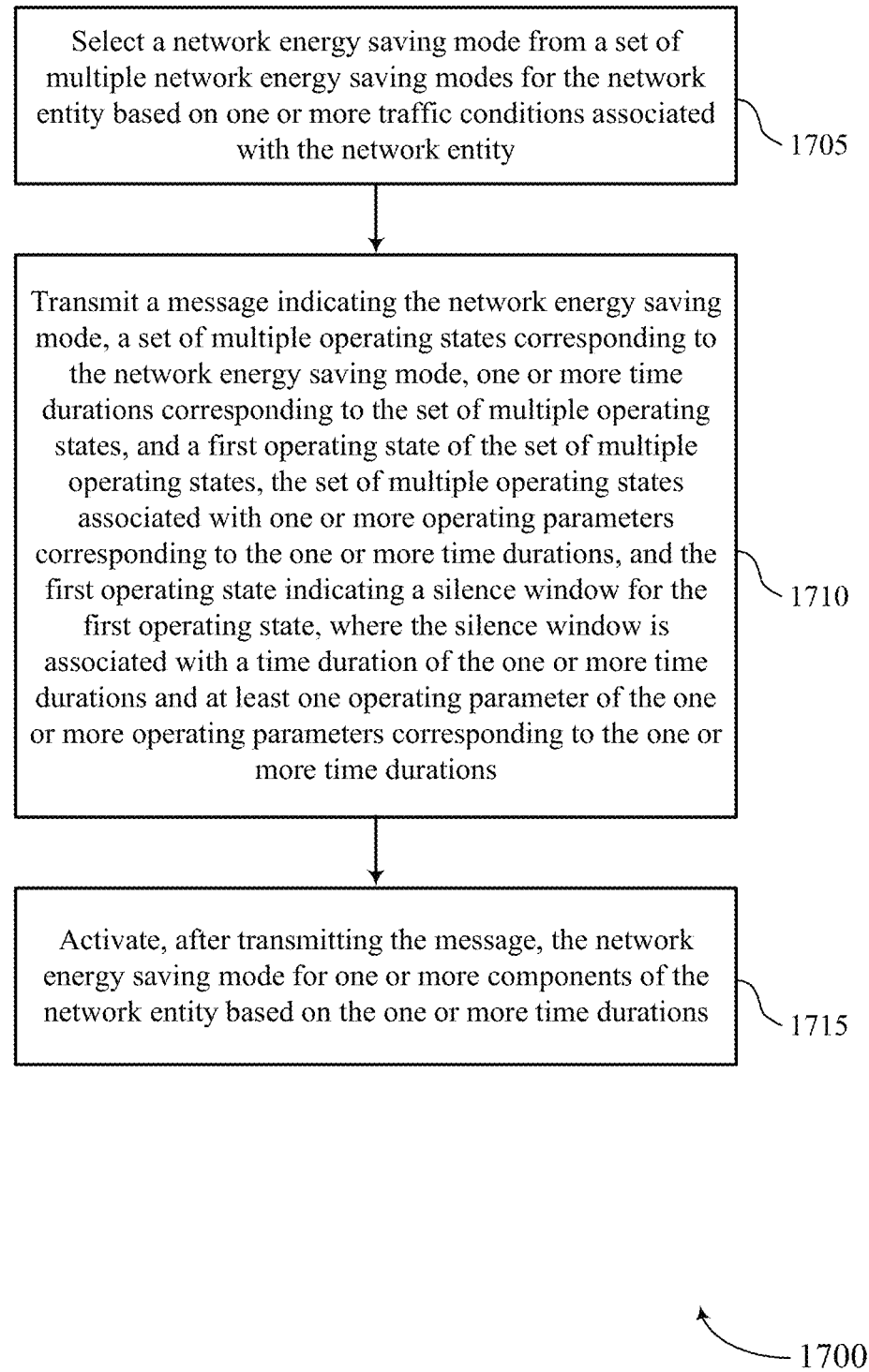

FIG. 17 shows a flowchart illustrating a method 1700 that supports operating states in green network energy saving modes in accordance with one or more aspects of the present disclosure. The operations of the method 1700 may be implemented by a network entity or its components as described herein. For example, the operations of the method 1700 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1705, the method may include selecting a network energy saving mode from a set of multiple network energy saving modes for the network entity based on one or more traffic conditions associated with the network entity. The operations of 1705 may be performed in accordance with examples as disclosed herein. In some examples, aspects of the operations of 1705 may be performed by a mode selection component 1025 as described with reference to FIG. 10.

At 1710, the method may include transmitting a message indicating the network energy saving mode, a set of multiple operating states corresponding to the network energy saving mode, one or more time durations corresponding to the set of multiple operating states, and a first operating state of the set of multiple operating states, the set of multiple operating states associated with one or more operating parameters corresponding to the one or more time durations, and the first operating state indicating a silence window for the first operating state, where the silence window is associated with a time duration of the one or more time durations and at least one operating parameter of the one or more operating parameters corresponding to the one or more time durations. The operations of 1710 may be performed in accordance with examples as disclosed herein. In some examples, aspects of the operations of 1710 may be performed by a message transmission component 1030 as described with reference to FIG. 10.

At 1715, the method may include activating, after transmitting the message, the network energy saving mode for one or more components of the network entity based on the one or more time durations. The operations of 1715 may be performed in accordance with examples as disclosed herein. In some examples, aspects of the operations of 1715 may be performed by a mode activation component 1035 as described with reference to FIG. 10.

Figure 18:
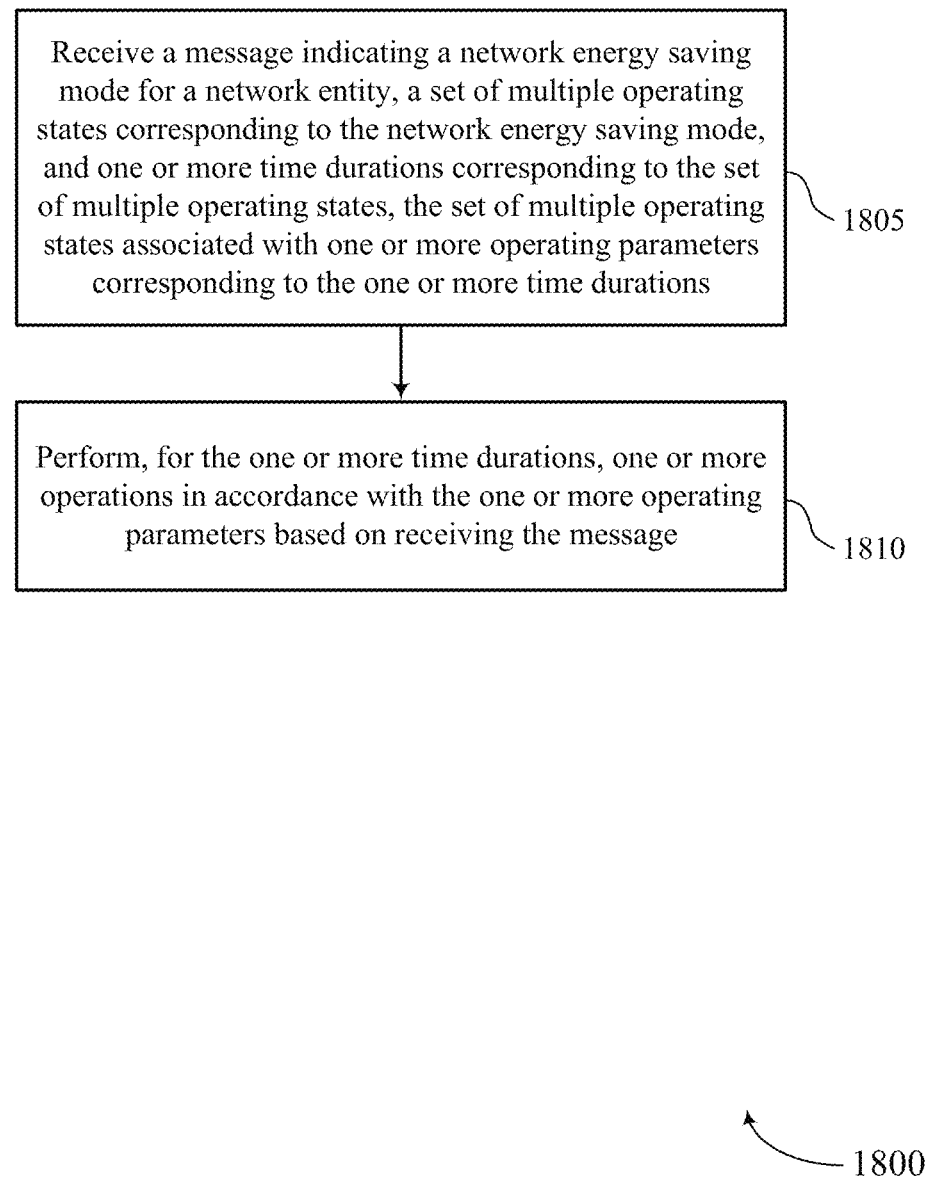

FIG. 18 shows a flowchart illustrating a method 1800 that supports operating states in green network energy saving modes in accordance with one or more aspects of the present disclosure. The operations of the method 1800 may be implemented by a UE or its components as described herein. For example, the operations of the method 1800 may be performed by a UE 115 as described with reference to FIGS. 1 through 7 and 12 through 15. In some examples, a UE may execute a set of instructions to control the functional elements of the UE to perform the described functions. Additionally, or alternatively, the UE may perform aspects of the described functions using special-purpose hardware.

At 1805, the method may include receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The operations of 1805 may be performed in accordance with examples as disclosed herein. In some examples, aspects of the operations of 1805 may be performed by a message reception component 1425 as described with reference to FIG. 14.

At 1810, the method may include performing, for the one or more time durations, one or more operations in accordance with the one or more operating parameters based on receiving the message. The operations of 1810 may be performed in accordance with examples as disclosed herein. In some examples, aspects of the operations of 1810 may be performed by an operations component 1430 as described with reference to FIG. 14.

Figure 19:
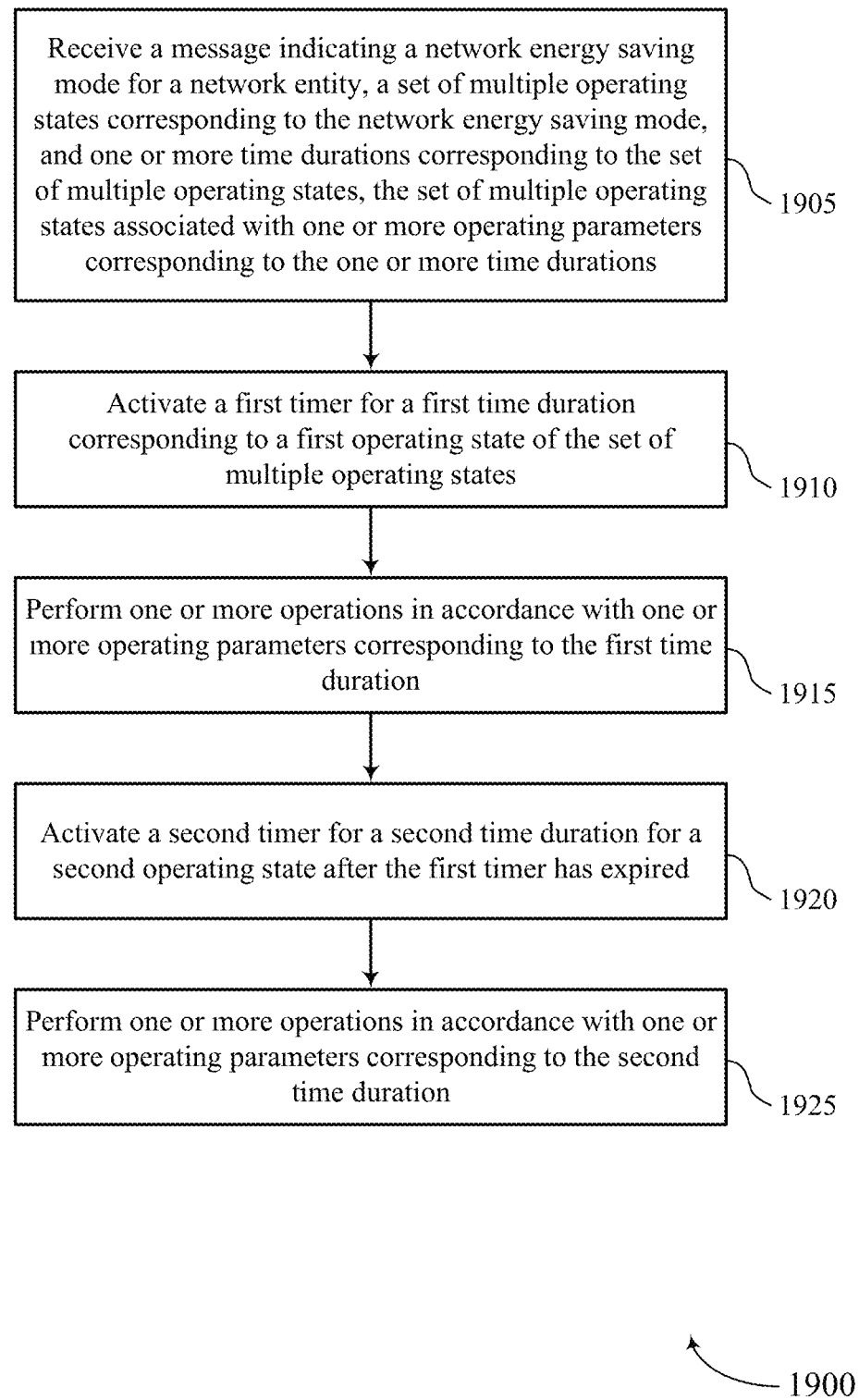

FIG. 19 shows a flowchart illustrating a method 1900 that supports operating states in green network energy saving modes in accordance with one or more aspects of the present disclosure. The operations of the method 1900 may be implemented by a UE or its components as described herein. For example, the operations of the method 1900 may be performed by a UE 115 as described with reference to FIGS. 1 through 7 and 12 through 15. In some examples, a UE may execute a set of instructions to control the functional elements of the UE to perform the described functions. Additionally, or alternatively, the UE may perform aspects of the described functions using special-purpose hardware.

At 1905, the method may include receiving a message indicating a network energy saving mode for a network entity, a set of multiple operating states corresponding to the network energy saving mode, and one or more time durations corresponding to the set of multiple operating states, the set of multiple operating states associated with one or more operating parameters corresponding to the one or more time durations. The operations of 1905 may be performed in accordance with examples as disclosed herein. In some examples, aspects of the operations of 1905 may be performed by a message reception component 1425 as described with reference to FIG. 14.

At 1910, the method may include activating a first timer for a first time duration corresponding to a first operating state of the set of multiple operating states. The operations of 1910 may be performed in accordance with examples as disclosed herein. In some examples, aspects of the operations of 1910 may be performed by a timer component 1435 as described with reference to FIG. 14.

At 1915, the method may include performing one or more operations in accordance with one or more operating parameters corresponding to the first time duration. The operations of 1915 may be performed in accordance with examples as disclosed herein. In some examples, aspects of the operations of 1915 may be performed by an operations component 1430 as described with reference to FIG. 14.

At 1920, the method may include activating a second timer for a second time duration for a second operating state after the first timer has expired. The operations of 1920 may be performed in accordance with examples as disclosed herein. In some examples, aspects of the operations of 1920 may be performed by a timer component 1435 as described with reference to FIG. 14.

At 1925, the method may include performing one or more operations in accordance with one or more operating parameters corresponding to the second time duration. The operations of 1925 may be performed in accordance with examples as disclosed herein. In some examples, aspects of the operations of 1925 may be performed by an operations component 1430 as described with reference to FIG. 14.

The following provides an overview of aspects of the present disclosure:

Aspect 1: A method for wireless communication at a network entity, comprising: selecting a network energy saving mode from a plurality of network energy saving modes for the network entity based at least in part on one or more traffic conditions associated with the network entity; transmitting a message indicating the network energy saving mode, a plurality of operating states corresponding to the network energy saving mode, and one or more time durations corresponding to the plurality of operating states, the plurality of operating states associated with one or more operating parameters corresponding to the one or more time durations; and activating, after transmitting the message, the network energy saving mode for one or more components of the network entity based at least in part on the one or more time durations.

Aspect 2: The method of aspect 1, wherein transmitting the message comprises: transmitting the message indicating a first operating state of the plurality of operating states, the first operating state indicating a silence window for the first operating state, wherein the silence window is associated with a time duration of the one or more time durations and at least one operating parameter of the one or more operating parameters corresponding to the one or more time durations.

Aspect 3: The method of aspect 2, wherein the at least one operating parameter indicates a parameter set for scheduling request transmissions within the silence window, the method further comprising: refraining from monitoring for one or more scheduling request transmissions for the time duration based at least in part on the parameter set for scheduling request transmissions.

Aspect 4: The method of any of aspects 2 through 3, wherein the at least one operating parameter indicates a parameter set for scheduling request transmissions within the silence window, wherein the parameter set indicates one or more scheduling request occasions for scheduling request transmissions, the method further comprising: monitoring for one or more scheduling request transmissions during the one or more scheduling request occasions based at least in part on the parameter set for scheduling request transmissions.

Aspect 5: The method of aspect 4, wherein the at least one operating parameter indicates that the one or more scheduling request occasions are for data having a priority above a threshold priority.

Aspect 6: The method of any of aspects 4 through 5, wherein the one or more scheduling request occasions comprise a first scheduling request occasion at a first time during the time duration; and a second scheduling request occasion at a second time during the time duration subsequent to the first time.

Aspect 7: The method of any of aspects 2 through 6, wherein the at least one operating parameter indicates a parameter set for data indication transmissions within the silence window, wherein the parameter set indicates one or more data indication occasions for data indication transmissions, the method further comprising: monitoring for one or more data indication transmissions during the one or more data indication occasions based at least in part on the parameter set for data indication transmissions.

Aspect 8: The method of aspect 7, further comprising: receiving a second message comprising a data indication, wherein the data indication indicates a presence of data at a UE; and activating an active mode based at least in part on receiving the second message comprising the data indication.

Aspect 9: The method of aspect 8, wherein the data indication comprises a sequence specific to the data indication.

Aspect 10: The method of any of aspects 8 through 9, wherein the data at the UE is associated with a priority above a threshold priority.

Aspect 11: The method of any of aspects 2 through 10, wherein the at least one operating parameter indicates deactivation of a periodic or aperiodic parameter set for scheduling request transmissions within the silence window.

Aspect 12: The method of any of aspects 1 through 11, wherein transmitting the message comprises: transmitting the message indicating the plurality of operating states, wherein each operating state of the plurality of operating states is specific to the network energy saving mode.

Aspect 13: The method of any of aspects 1 through 12, wherein transmitting the message comprises: transmitting the message indicating the plurality of operating states, wherein each operating state of the plurality of operating states is selected from a pool of operating states available for the plurality of network energy saving modes.

Aspect 14: The method of any of aspects 1 through 13, wherein transmitting the message comprises: transmitting the message via a DCI message.

Aspect 15: The method of any of aspects 1 through 14, further comprising: transmitting an RRC signal indicating the one or more operating parameters associated with the plurality of operating states.

Aspect 16: The method of aspect 15, wherein transmitting the RRC signal comprises: transmitting the RRC signal indicating the one or more operating parameters, wherein the one or more operating parameters comprise an indication of a power control, an indication of a data hold, or both.

Aspect 17: The method of any of aspects 1 through 16, further comprising: transmitting an RRC signal indicating a buffer threshold corresponding to an amount of data to buffer before a scheduling request transmission.

Aspect 18: The method of aspect 17, wherein the buffer threshold is specific to the network energy saving mode.

Aspect 19: The method of any of aspects 1 through 18, further comprising: transmitting a control message indicating a length of a silence window for a first operating state of the plurality of operating states, wherein the control message comprises one of a DCI signal or an RRC signal.

Aspect 20: A method for wireless communication at a UE, comprising: receiving a message indicating a network energy saving mode for a network entity, a plurality of operating states corresponding to the network energy saving mode, and one or more time durations corresponding to the plurality of operating states, the plurality of operating states associated with one or more operating parameters corresponding to the one or more time durations; and performing, for the one or more time durations, one or more operations in accordance with the one or more operating parameters based at least in part on receiving the message.

Aspect 21: The method of aspect 20, wherein performing the one or more operations in accordance with the one or more operating parameters for the one or more time durations comprises: activating a first timer for a first time duration corresponding to a first operating state of the plurality of operating states; performing one or more operations in accordance with one or more operating parameters corresponding to the first time duration; activating a second timer for a second time duration for a second operating state after the first timer has expired; and performing one or more operations in accordance with one or more operating parameters corresponding to the second time duration.

Aspect 22: The method of any of aspects 20 through 21, further comprising: performing one or more default operations after the one or more time durations.

Aspect 23: The method of any of aspects 20 through 22, wherein receiving the message comprises: receiving the message indicating a first operating state of the plurality of operating states, the first operating state indicating a silence window for the first operating state, wherein the silence window is associated with a time duration of the one or more time durations and at least one operating parameter of the one or more operating parameters corresponding to the one or more time durations.

Aspect 24: The method of aspect 23, wherein the at least one operating parameter indicates a parameter set for scheduling request transmissions within the silence window, the method further comprising: refraining from transmitting one or more scheduling requests for the time duration based at least in part on the parameter set for scheduling request transmissions.

Aspect 25: The method of any of aspects 23 through 24, wherein the at least one operating parameter indicates a parameter set for scheduling request transmissions within the silence window, wherein the parameter set indicates one or more scheduling request occasions for scheduling request transmissions, the method further comprising: transmitting one or more scheduling requests during the one or more scheduling request occasions based at least in part on the parameter set for scheduling request transmissions.

Aspect 26: The method of aspect 25, wherein the at least one operating parameter indicates that the one or more scheduling request occasions are for data having a priority above a threshold priority.

Aspect 27: The method of any of aspects 25 through 26, wherein the one or more scheduling request occasions comprise a first scheduling request occasion at a first time during the time duration; and a second scheduling request occasion at a second time during the time duration subsequent to the first time.

Aspect 28: The method of any of aspects 23 through 27, wherein the at least one operating parameter indicates a parameter set for data indication transmissions within the silence window, wherein the parameter set indicates one or more data indication occasions for data indication transmissions, the method further comprising: transmitting one or more data indications during the one or more data indication occasions based at least in part on the parameter set for data indication transmissions.

Aspect 29: The method of aspect 28, wherein transmitting the one or more data indications comprises: transmitting a second message comprising a data indication, wherein the data indication indicates a presence of data at a UE.

Aspect 30: The method of aspect 29, wherein the data indication comprises a sequence specific to the data indication.

Aspect 31: The method of any of aspects 29 through 30, wherein the data at the UE is associated with a priority above a threshold priority.

Aspect 32: The method of any of aspects 23 through 31, wherein the at least one operating parameter indicates deactivation of a periodic or aperiodic parameter set for scheduling request transmissions within the silence window.

Aspect 33: The method of any of aspects 20 through 32, wherein receiving the message comprises: receiving the message indicating the plurality of operating states, wherein each operating state of the plurality of operating states is specific to the network energy saving mode.

Aspect 34: The method of any of aspects 20 through 33, wherein receiving the message comprises: receiving the message indicating the plurality of operating states, wherein each operating state of the plurality of operating states is selected from a pool of operating states available for a plurality of network energy saving modes comprising the network energy saving mode.

Aspect 35: The method of any of aspects 20 through 34, wherein receiving the message comprises: receiving the message via a DCI message.

Aspect 36: The method of any of aspects 20 through 35, further comprising: receiving an RRC signal indicating the one or more operating parameters associated with the plurality of operating states.

Aspect 37: The method of aspect 36, wherein receiving the RRC signal comprises: receiving the RRC signal indicating the one or more operating parameters, wherein the one or more operating parameters comprise an indication of a power control, an indication of a data hold, or both.

Aspect 38: The method of any of aspects 20 through 37, further comprising: receiving an RRC signal indicating a buffer threshold corresponding to an amount of data to buffer before a scheduling request transmission; and transmitting a scheduling request based at least in part on an amount of data at a UE being greater than the buffer threshold.

Aspect 39: The method of aspect 38, wherein the buffer threshold is specific to the network energy saving mode.

Aspect 40: The method of any of aspects 20 through 39, further comprising: receiving a control message indicating a length of a silence window for a first operating state of the plurality of operating states, wherein the control message comprises one of a DCI signal or an RRC signal.

Aspect 41: An apparatus for wireless communication at a network entity, comprising a processor; memory coupled with the processor; and instructions stored in the memory and executable by the processor to cause the apparatus to perform a method of any of aspects 1 through 19.

Aspect 42: An apparatus for wireless communication at a network entity, comprising at least one means for performing a method of any of aspects 1 through 19.

Aspect 43: A non-transitory computer-readable medium storing code for wireless communication at a network entity, the code comprising instructions executable by a processor to perform a method of any of aspects 1 through 19.

Aspect 44: An apparatus for wireless communication at a UE, comprising a processor; memory coupled with the processor; and instructions stored in the memory and executable by the processor to cause the apparatus to perform a method of any of aspects 20 through 40.

Aspect 45: An apparatus for wireless communication at a UE, comprising at least one means for performing a method of any of aspects 20 through 40.

Aspect 46: A non-transitory computer-readable medium storing code for wireless communication at a UE, the code comprising instructions executable by a processor to perform a method of any of aspects 20 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, at the UE, a message indicating a network energy saving mode for a network entity, a plurality of operating states for the network entity corresponding to the network energy saving mode, and one or more time durations corresponding to the plurality of operating states, the plurality of operating states associated with one or more operating parameters corresponding to the one or more time durations, wherein a first operating state of the plurality of operating states indicates a silence window for the first operating state, wherein the silence window is associated with a first time duration of the one or more time durations and at least one operating parameter of the one or more operating parameters corresponding to the one or more time durations; and
   performing, at the UE for the one or more time durations, one or more operations in accordance with the one or more operating parameters based at least in part on receiving the message.

2. The method of claim 1, wherein performing the one or more operations in accordance with the one or more operating parameters for the one or more time durations comprises:
   activating a first timer for the first time duration corresponding to the first operating state of the plurality of operating states;
   performing one or more operations in accordance with the at least one operating parameter corresponding to the first time duration;
   activating a second timer for a second time duration for a second operating state after the first timer has expired; and
   performing one or more operations in accordance with one or more operating parameters corresponding to the second time duration.

3. The method of claim 1, further comprising:
   performing one or more default operations after the one or more time durations.

4. The method of claim 1, wherein the at least one operating parameter indicates a parameter set for scheduling request transmissions within the silence window, the method further comprising:
   refraining from transmitting one or more scheduling requests for the first time duration based at least in part on the parameter set for scheduling request transmissions.

5. The method of claim 1, wherein the at least one operating parameter indicates a parameter set for scheduling request transmissions within the silence window, wherein the parameter set indicates one or more scheduling request occasions for scheduling request transmissions, the method further comprising:
   transmitting one or more scheduling requests during the one or more scheduling request occasions based at least in part on the parameter set for scheduling request transmissions.

6. The method of claim 5, wherein the at least one operating parameter indicates that the one or more scheduling request occasions are for data having a priority above a threshold priority.

7. The method of claim 1, wherein the at least one operating parameter indicates a parameter set for data indication transmissions within the silence window, wherein the parameter set indicates one or more data indication occasions for data indication transmissions, the method further comprising:
   transmitting one or more data indications during the one or more data indication occasions based at least in part on the parameter set for data indication transmissions.

8. The method of claim 1, further comprising:
   receiving a radio resource control (RRC) signal indicating a buffer threshold corresponding to an amount of data to buffer before a scheduling request transmission; and
   transmitting a scheduling request based at least in part on an amount of data at the UE being greater than the buffer threshold.

9. An apparatus for wireless communication at a user equipment (UE), comprising:
   one or more processors;
   memory coupled with the one or more processors; and
   instructions stored in the memory and executable by the one or more processors to cause the UE to:
     receive a message indicating a network energy saving mode for a network entity, a plurality of operating states for the network entity corresponding to the network energy saving mode, and one or more time durations corresponding to the plurality of operating states, the plurality of operating states associated with one or more operating parameters corresponding to the one or more time durations, wherein a first operating state of the plurality of operating states indicates a silence window for the first operating state, wherein the silence window is associated with a first time duration of the one or more time durations and at least one operating parameter of the one or more operating parameters corresponding to the one or more time durations; and perform, for the one or more time durations, one or more operations in accordance with the one or more operating parameters based at least in part on receiving the message.

10. The method of claim 5, wherein the one or more scheduling request occasions comprise:
  a first scheduling request occasion at a first time during the first time duration; and
  a second scheduling request occasion at a second time during the first time duration subsequent to the first time.

11. The method of claim 7, wherein transmitting the one or more data indications comprises:
  transmitting a second message comprising a data indication, wherein the data indication indicates a presence of data at the UE.

12. The method of claim 11, wherein the data indication comprises a sequence specific to the data indication.

13. The method of claim 11, wherein the data at the UE is associated with a priority above a threshold priority.

14. The method of claim 1, wherein the at least one operating parameter indicates deactivation of a periodic or aperiodic parameter set for scheduling request transmissions within the silence window.

15. The method of claim 1, wherein receiving the message comprises:
  receiving the message indicating the plurality of operating states, wherein each operating state of the plurality of operating states is specific to the network energy saving mode.

16. The method of claim 1, wherein receiving the message comprises:
  receiving the message indicating the plurality of operating states, wherein each operating state of the plurality of operating states is selected from a pool of operating states available for a plurality of network energy saving modes comprising the network energy saving mode.

17. The method of claim 1, wherein receiving the message comprises:
  receiving the message via a downlink control information (DCI) message.

18. The method of claim 1, further comprising:
  receiving a radio resource control (RRC) signal indicating the one or more operating parameters associated with the plurality of operating states.

19. The method of claim 18, wherein receiving the RRC signal comprises:
  receiving the RRC signal indicating the one or more operating parameters, wherein the one or more operating parameters comprise an indication of a power control, an indication of a data hold, or both.

20. The method of claim 8, wherein the buffer threshold is specific to the network energy saving mode.

21. The method of claim 1, further comprising:
  receiving a control message indicating a length of the silence window for the first operating state of the plurality of operating states, wherein the control message comprises one of a downlink control information (DCI) signal or a radio resource control (RRC) signal.

22. The apparatus of claim 9, wherein the instructions to perform the one or more operations in accordance with the one or more operating parameters for the one or more time durations are executable by the one or more processors to cause the UE to:
  activate a first timer for the first time duration corresponding to the first operating state of the plurality of operating states;
  perform one or more operations in accordance with the at least one operating parameter corresponding to the first time duration;
  activate a second timer for a second time duration for a second operating state after the first timer has expired; and
  perform one or more operations in accordance with one or more operating parameters corresponding to the second time duration.

23. The apparatus of claim 9, wherein the instructions are further executable by the one or more processors to cause the UE to:
  perform one or more default operations after the one or more time durations.

24. The apparatus of claim 9, wherein the at least one operating parameter indicates a parameter set for scheduling request transmissions within the silence window, and the instructions are further executable by the one or more processors to cause the UE to:
  refrain from transmitting one or more scheduling requests for the first time duration based at least in part on the parameter set for scheduling request transmissions.

25. The apparatus of claim 9, wherein the at least one operating parameter indicates a parameter set for scheduling request transmissions within the silence window, wherein the parameter set indicates one or more scheduling request occasions for scheduling request transmissions, and the instructions are further executable by the one or more processors to cause the UE to:
  transmit one or more scheduling requests during the one or more scheduling request occasions based at least in part on the parameter set for scheduling request transmissions.

26. The apparatus of claim 25, wherein the at least one operating parameter indicates that the one or more scheduling request occasions are for data having a priority above a threshold priority.

27. A non-transitory computer-readable medium storing code for wireless communication at a user equipment (UE), the code comprising instructions executable by one or more processors to cause the UE to:
  receive, at the UE, a message indicating a network energy saving mode for a network entity, a plurality of operating states for the network entity corresponding to the network energy saving mode, and one or more time durations corresponding to the plurality of operating states, the plurality of operating states associated with one or more operating parameters corresponding to the one or more time durations, wherein a first operating state of the plurality of operating states indicates a silence window for the first operating state, wherein the silence window is associated with a first time duration of the one or more time durations and at least one operating parameter of the one or more operating parameters corresponding to the one or more time durations; and
  perform, at the UE for the one or more time durations, one or more operations in accordance with the one or more operating parameters based at least in part on receiving the message.

28. An apparatus for wireless communication at a user equipment (UE), comprising:
  means for receiving a message indicating a network energy saving mode for a network entity, a plurality of operating states for the network entity corresponding to the network energy saving mode, and one or more time durations corresponding to the plurality of operating states, the plurality of operating states associated with one or more operating parameters corresponding to the one or more time durations, wherein a first operating state of the plurality of operating states indicates a silence window for the first operating state, wherein the silence window is associated with a first time duration of the one or more time durations and at least one operating parameter of the one or more operating parameters corresponding to the one or more time durations; and means for performing, for the one or more time durations, one or more operations in accordance with the one or more operating parameters based at least in part on receiving the message.

* * * * *